United States Patent
Florescu

(10) Patent No.: US 12,269,032 B2
(45) Date of Patent: Apr. 8, 2025

(54) CLINICAL SPECTROPHOTOMETER FOR GENERAL CHEMISTRY, IMMUNO-ASSAY AND NUCLEIC ACID DETECTION

(71) Applicant: In Diagnostics, Inc., Carlsbad, CA (US)

(72) Inventor: Octavian Florescu, Carlsbad, CA (US)

(73) Assignee: In Diagnostics, Inc., Carlsbad, CA (US)

( * ) Notice: Subject to any disclaimer, the term of this patent is extended or adjusted under 35 U.S.C. 154(b) by 164 days.

(21) Appl. No.: 17/929,291

(22) Filed: Sep. 1, 2022

(65) Prior Publication Data

US 2023/0001414 A1    Jan. 5, 2023

Related U.S. Application Data

(63) Continuation of application No. PCT/US2021/023741, filed on Mar. 23, 2021.

(60) Provisional application No. 63/009,190, filed on Apr. 13, 2020, provisional application No. 62/994,131, filed on Mar. 24, 2020.

(51) Int. Cl.
*B01L 3/00* (2006.01)
*B01L 7/00* (2006.01)
*G01N 21/31* (2006.01)

(52) U.S. Cl.
CPC ......... *B01L 3/502715* (2013.01); *B01L 7/52* (2013.01); *G01N 21/31* (2013.01); *B01L 2300/0654* (2013.01); *B01L 2300/0681* (2013.01); *B01L 2300/165* (2013.01); *G01N 2201/062* (2013.01); *G01N 2201/0636* (2013.01)

(58) Field of Classification Search
CPC ............... B01L 3/502715; B01L 7/52; B01L 2300/0654; B01L 2300/0681; B01L 2300/165; B01L 2200/028; B01L 2300/022; B01L 3/502761; G01N 21/31; G01N 2201/062; G01N 2201/0636; G01N 21/253; G01N 21/255; G01J 3/0205; G01J 3/0208; G01J 3/021; G01J 3/0256; G01J 3/42

See application file for complete search history.

(56) References Cited

U.S. PATENT DOCUMENTS

| 4,849,340 A | 7/1989 | Oberhardt |
| 2002/0119486 A1* | 8/2002 | Oberhardt .......... G01N 33/4905 435/6.12 |
| 2004/0022678 A1 | 2/2004 | Komagoe et al. |
| 2006/0254962 A1 | 11/2006 | Samsoondar |

(Continued)

FOREIGN PATENT DOCUMENTS

| WO | WO 2012/038930 | 3/2012 |
| WO | WO 2021/195120 | 9/2021 |

*Primary Examiner* — Tarifur R Chowdhury
*Assistant Examiner* — Akbar H. Rizvi
(74) *Attorney, Agent, or Firm* — Levine Bagade Han LLP

(57) ABSTRACT

The single-use disposable spectrophotometer described herein can measure one or more blood chemistry analytes from a drop of whole blood. A passive filtration system takes whole blood and delivers plasma along with a dissolved reporter molecule to one or more spectrophotometers which can operate with narrow band optical spectrum centered on an optical detection frequency. The spectrophotometer detects the changes in absorption of the plasma as a result of a chemistry reaction to determine the concentration or activity of one or more analytes.

12 Claims, 19 Drawing Sheets

(56) References Cited

U.S. PATENT DOCUMENTS

2010/0183477 A1\* 7/2010 Kloepfer ............ A61B 5/14532
422/68.1
2011/0306856 A1 12/2011 Rule et al.
2017/0176255 A1\* 6/2017 Nciri ..................... G01J 3/0224

\* cited by examiner

CLINICAL SPECTROPHOTOMETER FOR GENERAL CHEMISTRY, IMMUNO-ASSAY AND NUCLEIC ACID DETECTION

CROSS-REFERENCE TO RELATED APPLICATIONS

This application is a continuation of International Application No. PCT/US2021/023741, filed Mar. 23, 2021, which claims the benefit of U.S. Provisional Application Nos. 62/994,131, filed Mar. 24, 2020; and 63/009,190, filed Apr. 13, 2020, all of which are incorporated by reference herein.

TECHNICAL FIELD

The present disclosure relates to single-use, disposable, digital biosensors and integrated circuit-based biosensors with whole blood sample preparation.

BACKGROUND

A chemistry test can be used to measure the concentration or activity of one or more analytes, i.e., endogenous compounds, circulating in blood. These analytes are often small molecules such as ions, blood gases and enzymes. Examples of analytes include albumin, blood urea nitrogen, uric acid, calcium, carbon dioxide (bicarbonate), chloride, creatinine, glucose, potassium, sodium, magnesium, phosphorus, lactate, amylase, lactate dehydrogenase, direct bilirubin, total cholesterol, high-density lipoprotein cholesterol, triglycerides, total bilirubin, total protein, creatine kinase, alanine aminotransferase (ALT), alkaline phosphatase (ALP), aspartate aminotransferase (AST) and gamma glutamyltransferase. These chemistry tests are also commonly referred to as blood chemistries, general chemistries, basic or complete metabolic panels, chemistry panels or specific organ panels. The results from a chemistry test can provide insight into the function of the kidneys, liver, heart, pancreas, bones and lungs among other biological systems.

The results from a chemistry test can be critically time sensitive, yet the instruments capable of performing such measurements are often relegated to emergency departments and central laboratories and require burdensome calibration and maintenance.

Spectrophotometry was developed by Arnold Beckman in 1940. While the testing modality for a variety of blood tests has evolved, spectrophotometry continues to be the bedrock of modern laboratory testing.

SUMMARY

The spectrophotometer can be miniaturized and integrated into a single-use disposable device. Users can place samples of blood from a finger-stick or venipuncture on the inlet of the device. The sample can be wicked into a membrane filtration sample preparation system, which can passively provide plasma to a disposable spectrophotometer for quantification of one or more analytes in the sample.

The spectrophotometer can have a variety of features: 1) the detection can be performed on undiluted samples, 2) the path length can be shorter than in conventional spectrophotometers, 3) the illumination can be from an LED emitting light with a narrow band optical spectrum, 4) the reflector can be made from injection molded plastic, 5) the reagents can be stored in a dry state in device and 6) there can be at least one photodiode per well, 7) the spectrophotometer can be integrated into a single-use, disposable device.

The device can be a single-use clinical spectrophotometer for measuring the concentration or activity of one or more analytes in a sample. The device can have:
a filter module that can be mounted on surface, wherein filter module can comprise a filter, a prefilter and one or a plurality of lamination surfaces and wherein filter and prefilter and one or a plurality of lamination surfaces can be laminated together;
wherein filter can be a plasma separation membrane, and wherein filter or prefilter can be impregnated with a reporter molecule;
a surface that can fluidically connect filter with spectrophotometer, wherein plasma from filter can flow directly from surface into spectrophotometer;
a chemical reaction that can be a homogenous reaction limited by the concentration or activity of analyte in plasma in well, and wherein reporter molecule can be a product or reactant to chemical reaction;
a spectrophotometer that can contain an optical cavity, wherein optical cavity can be a fluid stop gap;
wherein spectrophotometer can contain plasma with dissolved reporter molecule in suspension, wherein spectrophotometer can measure the rate of change or absolute change of the concentration of the reporter molecule in plasma in a well, and calculate a corresponding concentration or activity of an analyte in plasma in the well.

DETAILED DESCRIPTION

Figure 1A:
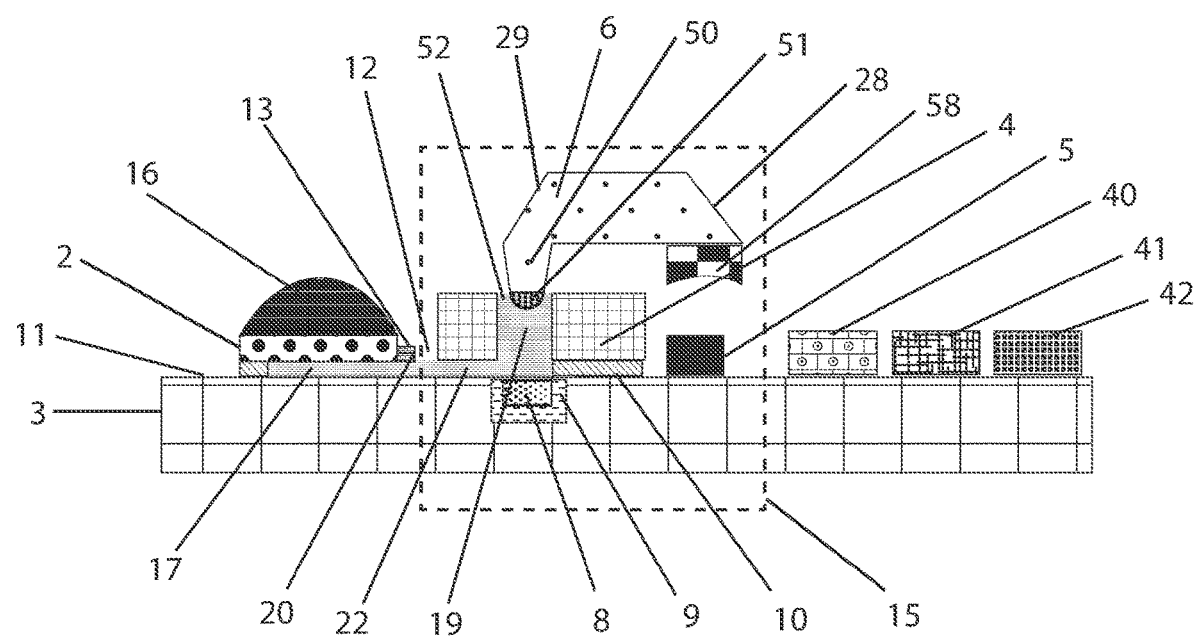
FIG. 1A presents a cross-sectional side view of a device comprising a filter, a surface and a spectrophotometer.

Spectrophotometer 15 can be an absorption spectrophotometer, wherein light 21 traverses through plasma 17 and wherein reporter molecule 56 can absorb part or all of light 21 traversing through plasma 17. Spectrophotometer 15 can be a reflectance spectrophotometer, wherein light 21 reflects off plasma 17 and wherein reporter molecule 56 can absorb part or all of light 21 reflecting off plasma 17. Spectrophotometer 15 can be a single frequency spectrophotometer. Spectrophotometer 15 can operate using a narrow band optical spectrum, centered at optical detection frequency 60. Spectrophotometer 15 can be configured to measure concentration or activity of analyte 36 in plasma 17. Spectrophotometer 15 can be configured to measure the absolute or rate of change of the absorption of plasma 17 in well 19 at the optical detection frequency 60. Spectrophotometer 15 can be configured to measure the rate of or absolute change in the absorption of reporter molecule 56 in plasma 17 in well 19 at the optical frequency 60. Spectrophotometer 15 can comprise a surface capillary 22 that can fluidically connect filter 2 or surface 11 with well 19. Spectrophotometer 15 can comprise a light emitting diode (LED) 5 capable of emitting light 21 with a peak frequency at optical detection frequency 60. LED 5 can be capable of emitting light 21 with a narrow band optical spectrum. Spectrophotometer 15 can comprise a reflector 6 capable of redirecting light 21 at a detection frequency 60 through plasma 17 in well 19 and onto photodetector 8. Reflector 6 can be capable of redirecting light 21 at a detection frequency 60 through plasma 17 normal to the detection plane of photodetector 8. Spectrophotometer 15 can comprise a photodetector 8 that can be sensitive to light 21 at a detection frequency 60. Photodetector 8 can be capable of measuring the change over time of the transmittance of plasma 17 in well 19 at detection frequency 60, resulting from the change over time of the concentration of reporter molecule 56 in plasma 17 in well 19, corresponding to the concentration or activity of analyte 36 in plasma 17 in well 19. Photodetector 8 can be capable of measuring the change over time of the transmittance of plasma 17 in well 19 at detection frequency 60, resulting from the change over time of interferences. Photodetector 8 can be capable of measuring the change over time in the transmittance of reporter molecule 56 in plasma 17 in well 19 at detection frequency 60.

Device 1 can analyze a variety of sample types such as whole blood, plasma, serum, plasma products, calibrators, purified solutions, tears, saliva and urine. Device 1 and spectrophotometer 15 can analyze aqueous samples in well 19. Device 1 can be used to measure the plasma concentration of albumin, blood urea nitrogen, uric acid, calcium, carbon dioxide (bicarbonate), chloride, creatinine, glucose, potassium, sodium, magnesium, phosphorus, lactate, amylase, lactate dehydrogenase, direct bilirubin, total cholesterol, high-density lipoprotein cholesterol, triglycerides, total bilirubin, total protein, creatine kinase, alanine aminotransferase (ALT), alkaline phosphatase (ALP), aspartate aminotransferase (AST) and gamma-glutamyl transferase, and other analytes. An analyte can also be referred to as an endogenous compound.

Multiplexing

The optical detection frequency 60 can be 340 nm, 405 nm, 467 nm, 550 nm, 600 nm, 850 nm or other frequencies. Spectrophotometer 15 can comprise a plurality of wells, through which light 21 can travel to a plurality of photodetectors. Spectrophotometer 15 can contain a single reflector 6 and a single LED 5, wherein reflector 6 has the necessary optical elements to split light 21 from a single LED 5 and redirect the split light through a plurality of wells onto a plurality of photodetectors. Each well can be above, below, adjacent, abutted or in proximity to a dedicated photodetector. Spectrophotometer 15 can have a plurality of wells, wherein each well can be each adjacent to a single photodetector. Device 1 can comprise a single filter 2 and a plurality of wells, such that plasma 17 from whole blood 16 can flow passively from filter 2, across one or more surfaces into a plurality of wells. A plurality of spectrophotometers can share a single filter, such that plasma 17 from whole blood 16 can flow passively from filter 2 into a plurality of wells in a plurality of spectrophotometers. Device 1 can comprise one or more surfaces that can fluidically connect one or more filters to one or more wells in one or more spectrophotometers. Device 1 can comprise a plurality of spectrophotometers, wherein the plurality of spectrophotometers can operate at different frequencies of detection. A plurality of spectrophotometers can share a single IC 9 or AOW 4.

Reaction

Chemical reaction 35 can be composed of multiple reactions. Chemical reaction 35 can be homogeneous and label-free. Chemical reaction 35 can be limited by the concentration or activity of analyte 36 in plasma 17 in well 19. For chemical reaction 35 to be limited by the concentration or activity of analyte 36, the concentration or activity of analytes 36 can be rate limiting reagents in chemical reaction 35 or the concentration or activity of analytes 36 can be the endpoint limiting reagents in chemical reaction 35. Reporter molecule 56 can be a product or reactant to chemical reaction 35. Reporter molecule 56 can be in excess in chemical reaction 35 wherein reporter molecule 56 may not be the rate limiting reagent. Dissolved reagents 33 can be in excess in plasma 17 such that chemical reaction 35 can limited by the concentration or activity of analyte 36. Reporter molecule 56 or reporter reagent can be a molecule that can absorb light with a linear extinction coefficient, whereby changes in the concentration of reporter molecule 56 can be calculated using Beer-Lambert's law. Reporter molecule 56 can absorb light at the optical detection frequency 60. Reporter molecule 56 can have an absorption peak at the optical detection frequency 60.

Chemical reactions 35 can be a zero-order, pseudo-zero order, a first order or a higher order chemical reaction. In a rate measurement, the rate of reporter molecule 56 consumed or produced can be measured. This rate can be proportional to concentration or activity of one or more analytes in plasma 17. In an endpoint measurement, the total amount of reporter molecule 56 consumed or produced can be measured. This amount can be proportional to a physiological concentration or activity of one or more analytes.

Chemical reaction 35 can alter the absorption of plasma 17 in well 19 at the optical detection frequency 60. Chemical reaction 35 can alter the concentration of reporter molecule 56 in plasma 17 in well 19. The change in concentration of reporter molecule 56 in plasma 17 in well 19 can change the absorption of plasma 17 in well 19 at the optical frequency of detection 60. By measuring light absorption of plasma 17 in well 19 from the LED 5 at two different time points, and accounting for the time elapsed, a rate or endpoint measurement of reactions 35 can be calculated.

Surface 11 can be coated with surface reagents 30. Surface 11 adjacent to gap 12 can be coated with a hydrophilic reagent 31, such as surface reagents 30. Filter 2 can be coated or impregnated with filter reagents 32. Well 19 can be coated on the inside with well reagents 34. The bottom surface of AOW 4 can be coated with surface reagents 30 or well reagents 34. Additional reagents 37 can be dried in the form of a dried sphere 38. The dried sphere 38 can be placed at the top of well 19, at the bottom of well 19, inside well 19, below the filter 2, above the filter 2, next to filter 2, or in gap 12. The dried sphere 38 can be manufactured through lyophilization. The diameter of the dried sphere 38 can be less than 2 mm, 1.5 mm, 1 mm, 0.75 mm, 0.5 mm, 0.4 mm, 0.3 mm, 0.2 mm, or 0.1 mm. The dried sphere 38 can dissolve when contacted with fluid, such as the plasma 17. All the reagents can be stored dry in device until re-hydrated by plasma 17.

A drop of whole blood 16 from a fingerstick or venous whole blood draw can be applied on filter 2. The whole blood 16 can mix with filter reagents 32. Filter 2 can trap the blood cells in whole blood 16 and let pass through plasma 17. Plasma 17 can mix with filter reagents 32. Plasma 17 can flow from filter 2 onto surface 11. Plasma 17 can wick or sheet on surface 11, across gap 12, within slot 25. Hydrophilic reagent 31 can promote plasma 17 sheeting or wicking across gap 12 into surface capillary 22. Surface capillary 22 can be formed between the AOW 4 and surface 11, or between the IC 9 and surface 11. Plasma 17 can mix with surface reagent 30. Surface capillary 22 can connect to well 19 such that Plasma 17 can flow from surface capillary 22 and into well 19. Plasma 17 can flow up or down well 19 due to capillary action and can cease to flow once it reaches the opposite side of well 19. Plasma can contact lens 51 or protrusion 50 and excess plasma can vent through vent 52. A vent 52 can be an air channel that lets air pass through.

Reporter molecule 56 can be included in surface reagents 30, hydrophilic reagents 31, filter reagents 32, well reagents 34, or additional reagents 37. Plasma 17 can mix with or dissolve dried reporter molecule 56 surface reagents 30, hydrophilic reagents 31, filter reagents 32, prefilter reagents, well reagents 34 and additional reagents 37. Reporter molecule 56, surface reagents 30, hydrophilic reagents 31, filter reagents 32, well reagents 34, or additional reagents 37 can combine or dissolve into dissolved reagents 33 in plasma 17. Reporter molecule 56, surface reagents 30, hydrophilic reagents 31, filter reagents 32, well reagents 34, or additional reagents 37 can dissolve upon contact with plasma 17.

The dissolved reagents 33 in plasma 17 can participate in or initiate chemical reaction 35 in plasma 17 in well 19 that can alter the plasma absorption of plasma 17 in well 19 at an optical detection frequency 60.

Device 1 can be configured to perform two multiplexed chemistry tests. A chemistry test that can have medical relevance is alanine aminotransferase (ALT) and aspartate aminotransferase (AST). The design in FIG. 1 can be configured so that ALT and AST measurements are performed separately and concurrently in well 19 and well 7, respectively. ALT can be performed using Filter 2, on surface 11 inside channel 25 and in well 19. AST can be performed using filter 55, on surface 11 inside channel 23 and in well 7. The chemical reactions for measuring ALT and AST are two examples of chemical reaction 35.

The chemical reaction for measuring ALT can comprise 1) ALT in plasma catalyzing the transfer of an amino group from L-alanine to alpha-ketoglutarate to form L-glutamate and pyruvate, and 2) lactate dehydrogenase (LDH) catalyzing the conversion of pyruvate to lactate and the oxidation of Nicotinamide adenine dinucleotide (NADH) to NAD+. The chemical reaction for measuring AST can comprise 1) AST catalyzing the conversion of L-aspartate and alpha-ketoglutarate into oxaloacetate and L-glutamate, and 2) Malate dehydrogenase (MDH) catalyzing the conversion of oxaloacetate into malate and the oxidation of NADH to NAD+. The reagent substrates for measuring AST and ALT can be introduced in abundance so the rate of the chemical reactions can be limited by the rate of endogenous AST and ALT in the plasma 17, respectively. The reporter molecule 56 for both ALT and AST reactions can be NADH. NADH has a narrow band absorptions spectrum centered on 340 nm, so the amount or rate of NADH consumed in the chemical reactions can be measured by illuminating the wells 19 and 7 with light from an LED 5 emitting light 21 with a narrow band optical spectrum with an optical detection frequency of 340 nm. Reflector 6 can redirect light 21 from LED 5 into both wells 7 and 19. In a rate measurement, the rate of change of the absorption at 340 nm can be due to the conversion of NADH to NAD+ and can be proportional to the amount of ALT or AST present in the plasma 17. Photodetector 8 can measure the change in the amount of light transmitted through the plasma 17 in well 19 over time, and can determine from calibration values stored on the IC 9 the corresponding concentration of endogenous ALT and AST.

Filter reagents for filter 2 for ALT can comprise dried 1-alanine, NADH, alpha-ketoglutarate, LDH and excipients. The surface reagents for ALT can comprise 1-alanine, NADH, alpha-ketoglutarate, LDH and excipients. The well reagents for ALT can comprise hydrophilic reagents to maximize the capillary force, 1-alanine, NADH, alpha-ketoglutarate, LDH and excipients. The additional reagents for ALT can comprise 1-alanine, NADH, alpha-ketoglutarate, LDH and excipients.

Filter reagents for filter 55 for AST can comprise dried 1-aspartate, NADH, alpha-ketoglutarate, MDH and excipients. The surface reagents for AST can comprise 1-aspartate, NADH, alpha-ketoglutarate, MDH and excipients. The well reagents for AST can comprise hydrophilic reagents to maximize the capillary force, 1-aspartate, NADH, alpha-ketoglutarate, MDH and excipients. The additional reagents for AST can comprise 1-aspartate, NADH, alpha-ketoglutarate, MDH and excipients.

The ALT chemical reaction can be confined to well 19 by applying the ALT reagents exclusively to filter 2, on surface 11 inside channel 25 or in well 19. The AST chemical reaction can be confined to well 7 by applying the AST reagents exclusively to filter 55, on surface 11 inside channel 23 or in well 7.

Whole blood 16 can be applied the both filter 2 and filter 55 simultaneously. The chemical reactions in wells 19 and 7 can be measured concurrently or at different times.

ALT and AST are both examples of chemical reaction 35 where a rate measurement can be proportional to the activity of ALT and AST in whole blood 16. Chemical reaction 35 can be a rate reaction wherein the measurement can be performed in a single well 19.

Chemical reaction 35 can be an endpoint reaction, wherein the measurement can be performed in two wells, namely well 19 and well 7. Well 19 can be used to measure the concentration of reporter molecule 56 produced or consumed, while well 7 can be used to measure the concentration of reporter molecule 56 prior to any consumption or production. The dissolved reagents in well 7 can omit a key reagent necessary for chemical reaction 35, wherein the reporter molecule 56 in well 7 can be neither consumed nor produced.

The dominant source of noise in an ALT assay can be the natural oxidation of NADH into NAD+ by endogenous reactions other than chemical reaction 35. Well 7 can be used as a blank well to measure the natural oxidation of NADH, or other blank measurement. The blank measurement can be subtracted from the chemical reaction 35 in well 19, or from other chemistry reaction measurements, to eliminate the contribution of the natural oxidation of NADH or other sources of noise. L-alanine can be omitted from the dissolved reagents, such that chemical reaction 35 cannot run in well 7 and only the blank measurement can be made in well 7. In the case of ALT, NADH can be dried in Filter 2 that can be shared between the measurement wells 7 and 19. Blank wells can be used to measure interfering substances that can change the absorption of the plasma during run time of the assay.

Device 1 can contain a blank filter 55 which can produce plasma 17 without reporter molecule 56. Device 1 can contain a blank well 7 which can accumulate plasma 17 produced by blank filter 55, to measure the absorption of plasma 17 without reporter molecule 56, or blank measurement. The blank measurement can be used to determine the concentration of reporter molecule 56 dissolved in plasma 17, or the intrinsic absorption of plasma 17 or both. The blank measurement can be subtracted from the absorption measurements in other wells. The blank measurement or NADH-blank measurement can be combined to measure endpoint reactions by providing the concentration of the reporter reagent 56 before and after reaction 35 occurs.

The optical detection frequency 60 of the emission of the LEDs 5 can be selected to correspond to the spectral absorptivity of analyte 36 that yields the highest signal to noise ratio.

A plurality of wells can contain plasma with a plurality of dissolved reagents, wherein the dissolved reagents in one well can be different from the next well. A plurality of wells can be illuminated with light with a plurality of optical detection frequencies, wherein the optical detection frequencies in one well is different from the optical detection frequency of the next. A plurality of wells can receive plasma from a shared filter. Some wells can be used as blanks, wherein chemical reaction 35 may not proceed. The results from blank wells can be combined with the results from analyte measurement wells, wherein the concentration or activity of an analyte is measured.

Analyte Measurement

Spectrophotometer 15 can comprise an integrated circuit (IC) 9 that can integrate or embed one or more photodetectors, namely photodetector 8. IC 9 can integrate a calculation circuit that can calculate an absorption measurement from a transmittance measurement. The calculation circuit can calculate the rate of or absolute change of the absorption of reporter molecule 56 in plasma 17 in well 19 from the rate of or absolute change in the transmittance of reporter molecule 56 in plasma 17 in well 19. The calculation circuit can calculate the rate of or absolute change of the absorption of plasma 17 in well 19 from the rate of or absolute change in the transmittance of plasma 17 in well 19. The calculation circuits can calculate the ratio of serial measurements of transmittance. The calculation circuits can perform the logarithmic function in a base, such as 2, e, 8, 10, 16 or any other. The calculation circuits can perform the inverse logarithmic function, i.e. the exponential function in a base such as 2, e, 8, 10, 16 or any other. The calculation circuits can calculate the concentration or activity of analyte 36 in plasma 17 in well 19 using Beer-Lambert's law and serial measurements of the absorption or serial measurements of transmittances of plasma 17, the nominal path length in well 19, the elapsed time between serial measurements and the extinction coefficient of reporter molecule 56. The calculation circuits can calculate the concentration of analyte 36 in plasma 17 in well 19 from serial transmittance or absorption measurements from a control well. Calculation circuits can be arithmetic a logic unit (ALU), a digital signal processor (DSP) or a look-up table, or a combination thereof. Stored information stored or encoded in device 1 can be stored or encoded in volatile or non-volatile memory integrated in IC 9 or in a separate memory chip IC electrically connected to IC 9. Stored information can store or encode the nominal path length of well 19 and the extinction coefficient of reporter molecule 56.

Path Length Control

Path length 39 can be the distance traveled by light 21 from LED 5 through plasma 17 in well 19. Different rays of light 21 can travel a plurality of paths through plasma 17 in well 19. Path length 39 can be the mean of the distribution of the distances the different rays of light 21 traveled through plasma 17 in well 19. Path length 39 can be less than 5 mm, 4 mm, 3 mm, 2 mm, 1.5 mm, 1.25 mm, 1 mm, 0.75 mm, 0.6 mm, 0.5 mm, 0.4 mm, 0.3 mm, 0.25 mm. The coefficient of variance of the distribution of the distances the different rays of light 21 traveled through plasma 17 in well 19, can be less than 50%, 25%, 15%, 10%, 9%, 8%, 7%, 6%, 5%, 4%, 3%, 2% or 1%. For a device 1 with a plurality of wells, the path lengths for each well can differ.

A nominal path length is a length that can be calculated from design specifications and measurements to estimate the actual path length 39. The path length 39 in device 1 is generally much shorter than traditional quantitative spectrophotometers. So small manufacturing tolerances can greatly affect path length 39. The nominal path length of well 19 can be different from the actual path length 39 as a result of manufacturing tolerances. This difference between the actual path length 39 and the nominal path length can impact the performance of spectrophotometer 15. The nominal path lengths for each well or aspects of the nominal path length for each well can be measured individually or in combination during manufacturing and can be stored in the stored information. Aspects of the nominal path length that can be measured individually or in combination during manufacturing can include the depth of well 9, the thickness of tape 10, the profile of reflector 6, the profile of protrusion 50, the profile of lens 51, the co-planarity of IC 9 and surface 11, the position of LED 5 on PCB, the relative position of LED 5 with respect to reflector 6, the relative position of LED 5 with respect to well 19, and the relative position of reflector 6 with respect to well 19 or incident angle of light 21 on the detection plane of photodetector 8. Multiple aspects of the nominal path length can be combined mathematically or measured at once. The nominal path length can be a combination of one or more aspects of the nominal path length. The nominal path length can vary from the actual path length 39 by a path length error less than 20%, 15%, 10%, 9%, 8%, 7%, 6%, 5%, 4%, 3%, 2% or 1%.

Light scattering off the walls of well 19 can widen the distribution of the distances traveled by the rays of light 21 and therefore affect the path length error. The construction of well 19 and photodetector 8 can be configured to avoid or reduce detection of light 21 scattering off the walls of well 19. Photodetector 8 can be inset to the aperture of well 19 in proximity to photodiode 8 to reduce or eliminate the detection of light 21 scattering off the walls of well 19. The construction of well 19 and photodetector 8 can be configured to avoid or reduce light 21 scattering off the walls of well 19. The sidewalls of well 19 can have a draft angle of 1°, 2.5°, 5°, 10°, 12.5°, or 15°, wherein well 19 widens in the direction of photodetector 8. The draft angle can reduce or eliminate the scattering off the walls of well 19 of rays of light 21 that radiate out from reflector 6 and are not normal, i.e. not perpendicular, to the plane of photodetector 8.

Light 21 from LED 5 can be redirected by reflector 6 such that light 21 is incident normal or oblique to the plane of photodetector 8. For superior path length 39 control, light 21 can be incident normal to the plane of photodetector 8 so that stray rays at oblique angles can accrue minimal additional path length error by the combination of symmetry and trigonometry of small angles.

Another large source of path length error is the air-plasma interface at the top of well 19. The plasma meniscus at the top of well 19 can expand, contract or change shape at run time depending on the volume of plasma 17 extracted by filter 2. Protrusion 50 can contact the plasma 17 at the top of well 19 such that light 21 can travel directly from reflector 6 into plasma. Light 21 can avoid traversing the air-plasma interface.

Narrow Band Optical Spectrum

Optical detection frequency 60 can be the peak frequency of a narrow band optical spectrum. A narrow band optical spectrum can be an optical spectrum with frequency peak and Full Width Half Maximum (FWHM) of less than 200 nm, 100 nm, 50 nm, 25 nm, 20 nm, 15 nm, 10 nm, 5 nm, 4 nm, 3 nm, 2 nm or 1 nm.

Optical Filter

Light 21 emitted from LED 5 can have a broad spectrum with no or small peak frequency. Light 21 can be white light. To achieve operation with a narrow band optical spectrum at a single frequency, spectrophotometer 15 can contain an optical filter 80. An optical filter 80 can have an optical passband at the optical detection frequency 60. The passband bandwidth of optical filter 80 can be less than 200 nm, 100 nm, 50 nm, 25 nm, 20 nm, 15 nm, 10 nm, 5 nm, 4 nm, 3 nm, 2 nm or 1 nm. Optical filter 80 can be placed on or near photodetector 8, IC 9, inlet of reflector 6, lens 58 of reflector 6, lens 51, protrusion 50, reflector 6, LED 5, lens 57. Optical filter 80 can be placed in the path traveled by light 21 between LED 5 and photodetector 8. Optical filter 80 can be coated on photodetector 8, IC 9, inlet of reflector 6, lens 58 of reflector 6, lens 51, protrusion 50, reflector 6, LED 5, lens 57. Device 1 can contain a plurality of spectrophotometers with optical filters having the same or different optical passbands.

Integrated Circuit

IC 9 can be a Complementary Metal Oxide Semiconductor (CMOS) IC. IC 9 can comprise a photodetector 8 electrically connected to a charge integrator such as a capacitor. Photodetector 8 can produce a photocurrent that is proportional to the light incident on the surface of photodetector 8. The photocurrent can charge or discharge the charge integrator. The charge integrator can be connected to an amplifier or a comparator embedded on IC 9. The IC 9 can generate a first reference voltage that can be used as a comparison trigger for the comparator. IC 9 can drive a current through LED 5. IC 9 can pre-charge the charge integrator to a second reference voltage. IC 9 can drive current through LED 5 and measure the integration time until the charge integrator voltage reaches the first reference voltage and triggers the comparator. The integration time can be the time elapsed from when the charge integrator is no longer pre-charged until the comparator is triggered and switches state. The charge integrator voltage or input of the comparator can be chopped to minimize 1/f noise. The input of the comparator can be inverted. The average integration time can be the average between the two integration times with the comparator inputs in the inverted and non-inverted states. The average integration time can correspond to the radiant flux of light from LED 5 incident on photodetector 8, and by extension corresponds to the concentration or activity of analytes 36 being measured. IC 9 can make one or more time resolved plasma absorption measurements of the absorption of plasma 17 in well 19 before, during or after reactions 35.

IC 9 can integrate a microcontroller or microprocessor to control the state of device 1, memory to store calibration data and results, a power management unit to drive the LEDs and sink power from the battery 40. IC 9 can integrate a boost converter or a power converter to increase the supply voltage above what the batteries 40 can supply. By integrating a boost converter, the supply voltage for IC 9, LED 5 and display 41 can be boosted up and device 1 can run off a single battery 40. Device 1 can sink less than 20 mA, or less than 10 mA or less than 5 mA or less than 2 mA or less than 1 mA or less than 0.5 mA from battery 40.

Temperature Control

Temperature is an important factor that can alter the optical power emitted by LED 5, the sensitivity of photodetector 8 or the activity of enzymes or other reagents in reactions 35. IC 9 can integrate one or more temperature sensors to measure the temperature of IC 9, surface 11, plasma 17, LED 5 or the ambient temperature inside device 1. Temperature sensors can be any electronic device with deterministic temperature coefficients, such as bipolar junction transistors (BJT), diodes, bandgap or resistors. The one or more temperature sensors can be calibrated during manufacturing using a single point manufacturing temperature calibration or a multi-point temperature calibration. The temperature sensors can be soaked and calibrated at manufacturing temperature during manufacturing. The Manufacturing temperature can be equal to the run time heater temperature, such as 25 C, 30 C, 35 C, 36 C, 37 C, 38 C, 39 C or 40 C. Run time can be defined as the time when device 1 is activated. The one or more temperature sensor calibration values and algorithms to combine them with run time temperature measurements can be stored in memory on IC 9. Temperature sensor calibration values can be combined with run time temperature measurements from temperature sensors to provide accurate temperature measurements. Calibrated run time temperature measurements can be accurate to within 2 C, 1 C, 0.5 C, 0.25 C or 0.1 C of actual temperatures. LED 5, BJTs integrated in IC 9, and resistors integrated in IC 9 can be temperature sensors. The calibration measurements from temperature sensors can be used to mathematically compensate the plasma absorption measurements for temperature changes at run time or differences between run time temperature and manufacturing temperature.

IC 9 can integrate a bandgap or other circuits to generate currents with or without temperature compensation. The current through LED 5 can be temperature compensated to control the output power of LED 5. The temperature coefficient and electronic characteristics of LED 5 at manufacturing temperature can be measured and stored in the memory of IC 9. The temperature coefficient of LED 5 can be used to compensate for temperature changes at run time or differences between run time temperature and manufacturing temperature. LED 5 can be used to measure the junction temperature of LED 5 at run time using the temperature coefficient and electronic characteristics of LED 5. Electronics to measure the junction temperature of LED 5 at run time can be integrated in IC 9. The first or second reference voltage for the comparator can be compensated so the integration time of the photocurrent is constant or nearly constant with respect to changes in run temperature or difference between run time temperature and manufacturing temperature.

Reactions 35 can provide higher signal to noise ratio at higher reaction temperatures, namely physiological temperature between 30 C and 40 C, such as 30 C, 35 C, 36 C, 37 C, 38 C, 39 C or 40 C. IC 9 can integrate circuits to raise the reaction temperature of reactions 35 or maintain reaction temperature to within 2 C, 1 C, 0.5 C, 0.25 C, 0.125 C of a desired reaction temperature. IC 9 can integrate one or more heaters circuits to raise the reaction temperature of reactions 35 or maintain reactions 35 at to within 2 C, 1 C, 0.5 C, 0.25 C, 0.125 C of a desired reaction temperature. The heaters can be heater resistors integrated in IC 9. Heater resistors can be integrated into the silicon substrate of IC 9. Heater resistors integrated into the silicon substrate of IC 9 can be n-well, p-well or doped well resistors. Heater resistors can be integrated into the inter-layer dielectric (ILD) of IC 9. Heater resistors integrated into the ILD can include resistors fabricated out of poly-silicon or metal. The heater can be heated to a run time heater temperature. The run time heater temperature can be measure by a temperature sensor. The reaction temperature can be measure by a temperature sensor.

A temperature sensor can be placed in proximity to the heater. A temperature sensor can be placed to within 1 mm, 500 um, 250 um, 125 um, 100 um, 50 um, 25 um, 20 um, 10 um or 5 um of the heater for superior temperature control. The heater can be a temperature sensors. A temperature sensor can be placed in the ILD near or at the surface of the IC to measure the reaction temperature or the temperature of the plasma 17 in well 19 above the IC. The reaction temperature can the temperature of the plasma 17 in well 19. Metal pads or vias can be used to thermally couple plasma 17 in well 19 above IC 9 to a sensor embedded in IC 9.

The power through the heater can be modulated. Examples of heater modulation schemes include pulse width modulation, amplitude modulation and frequency modulation. The run time heater temperature can be different than the reaction temperature by a heat loss offset. IC can compensate for the heat loss offset by increasing the run time heater temperature. The heat loss offset can be estimated using the steady state power consumption of the heater. The heater can be a well resistor embedded in the silicon substrate of IC 9. The heater can be circular and circumscribe around the outer perimeter of photodetector 8. The heater can be constructed from a number of separate resistor in parallel and series. The heater can be powered using digital pulse width modulation techniques. The volume of plasma in well 19 can be less than 1 ul and the distance from photodiode 8 to the opposite end of well 19 can be less than 1 mm to ensure rapid and even distribution of the heat from the heater to the plasma 17.

Photodetector

All the photodetectors on IC 9 can be equidistant from one-another and arranged in a line. Deviations from this linear equidistant photodetector placement can be less than 1 mm, 0.5 mm, or 0.25 mm. The photodetectors on IC 9 can be approximately equidistant from one-another and approximately arranged in a line. The photodetectors on IC 9 can less than 3 mm, 2.5 mm, 2 mm, 1.75 mm, 1.5 mm, 1.25 mm, 1 mm, or 0.5 mm apart. Photodetector 8 can be any photoelectric device sensitive to the intensity of light. Photodetector 8 can be an active pixel sensor or charge coupled sensor. Photodetector 8 can be any photosensitive CMOS device. Photodetector 8 can be a photodiode. Photodetector 8 can be a polysilicon photodiode or a photodiode embedded in the substrate. Photodetector 8 can be n-doped or a p-doped well diode. Photodetector 8 can be implemented in an isolation well or in a stacked configuration to eliminate cross-talk from other photodetectors integrated in IC 9 or other noisy electronics integrated on IC 9. The passivation and dielectric layers above photodetector 8 can be thinned or etched to minimize attenuation of light through the ILD before reaching the embedded photodetector 8. Silicon dioxide from the ILD of IC 9 can have similar refractive index as plasma 17. Silicon dioxide from the ILD can be exposed above photodetector 8 to eliminate reflections. Standard passivation layers like polyimide and silicon nitride with different diffractive indexes to plasma 17 be etched, removed or eliminated above photodetector 8. The optical detection frequency be ultra-violet (UV), namely at 340 nm and 405 nm wavelengths. Light 21 at 340 nm and 405 nm wavelengths may not penetrated deep into the silicon substrate. To improve the quantum efficiency of photodetector 8 for 340 nm or 405 nm wavelengths, photodetector 8 can comprise a shallow junction photodiode integrated in the silicon substrate. The depth of the junction of photodetector 8 can be less than 5 um, 4 um, 3 um, 2 um, 1 um, 0.5 um or 0.25 um. The profile of the junction can be exponentially decreasing or a buried Gaussian. An epi-layer, or a buried implant layer or a buried reverse implant layer can be embedded in the silicon substrate below the junction of the photodiode 8 to tailor the junction thickness and increase sensitivity at UV optical frequencies.

Photodetector 8 can be larger on a side than 10 um, 50 um, 100 um, 200 um, 300 um, 400 um, 500 um, or 1 mm. The area of photodetector can be larger than 100 um2, 1000 um2, or 1 mm2. The area of photodetector 8 can be larger than or equal to the cross-sectional area of the aperture of well 19 in proximity to photodetector 8 to capture all the light 21 that enters well 19.

Multiple photodetector can be placed below each well 19. The photodetectors can be manufactured using different material or have one or more optical color filters patterned or placed on them to discriminate different frequencies of light 21. The surface of the IC 9 can be coated with an anti-reflective coating (ARC) to minimize the amount of light that reflects off the surface of the IC 9 before reaching the photodetector 8.

Photodetector 8 can be placed below, above or laterally to well 19 such that photodetector 8 can detect or measure the intensity of the light that traveled through well 19 along path length 39. Photodetector 8 can detect or measure the plasma absorption of plasma 17 in well 19 along path length 39. The Photodetector 8 can be integrated into IC 9. IC 9 can be embedded inside, above, on or below PCB 3. IC 9 can be mounted parallel to or flush with PCB 3.

Plasma Filter

Filter 2 can comprise one or more plasma separation membranes, one or more structures to elute filter reagents 32, one or more structures to promote mixing of plasma 17 with filter reagents 32 or one or more structures to slow or control the flow of plasma 17. Filter 2 can comprise multiple stacked, abutted, offset or laminated filters. Filter 2 can be square, circular or any other arbitrary shape. Filter 2 can be manufactured from polyethersulfone/polyvinylpyrrolidone (PES/PVP) and have graduated porosity to trap red blood cells. Filter 2 can be coated with glycine or other reagents to minimize cell leakage and lysis. The area of filter 2 can be less than 10 mm$^2$ or 30 mm$^2$ or 100 mm$^2$ or 300 mm$^2$ and can accept less than 50 ul, 25 ul, 15 uL, 10 ul, 5 ul of whole blood. Filter 2 can be mounted in proximity, above, below, on or laterally to surface 11 or AOW 4. Filter 2 can accept whole blood 16 and block red blood cells from flowing to well 19. Platelets and white blood cells are interferers in spectrophotometer implementations due to light scattering. Historically, the solution to eliminating white blood cells has been to spin down the whole blood for an extended period of time and remove the buffy layer. Filter 2 can be configured to rapidly block white blood cells and platelets. Filter 2 can have a constriction layer with pore size smaller than 2.5 um, 2 um, 1.5 um, 1 um, 0.75 um, or 0.5 um.

Filter 2 can be mounted above, below, laterally or in proximity to surface 11 or AOW 4. The distance from filter 2 to surface 11 can be less than 0.5 mm, 200 um, 100 um, 50 um, 25 um, 10 um, 1 um. Filter 2 can be snap-fit, friction fit, heat staked, glued or adhered to surface 11 or AOW 4. Filter 2 can be adhered to surface 11 or AOW with double-sided tape 10. Filter 2 can contact surface 11 or AOW 4. Plasma can flow through filter 2 onto surface 11. Filter 2 can be impregnated with dried filter reagents 32 that become dissolved into plasma 17.

Plasma Flow

Filter 2 can be in proximity to and fluidically connected to spectrophotometer 15 such that plasma 17 from whole blood 16 can flow directly or indirectly from filter 2 into spectrophotometer 15. Plasma 17 from whole blood 16 can flow passively from filter 2 into spectrophotometer 15 without assistance from the user or pneumatic forces. Plasma 17 from whole blood 16 can flow from filter 2 into spectrophotometer 15 as a result of surface tension effects, such as capillary or low contact angle on surface 11. Filter 2 can be in proximity to or fluidically connected to well 19 such that plasma 17 from whole blood 16 can flow directly or indirectly from filter 2 into well 19. Plasma 17 from whole blood 16 can flow passively from filter 2 into well 19 without assistance from the user or pneumatic pressure differentials. Plasma 17 from whole blood 16 can flow from filter 2 into well 19 as a result of surface tension effects, such as capillary effects in well 19 and low contact angle on surface 11. Filter 2 can be fluidically connected to spectrophotometer 15 by surface 11. Filter 2 can be fluidically connected to well 19 of spectrophotometer 15 by capillary 22. Surface 11 can be the surface of a printed circuit board (PCB) 3 or the surface of the Array of Wells (AOW) 4 or the surface of an integrated circuit (IC) 9. Surface 11 can be co-planar with IC 9, wherein surface 11 can be the surface of photodetector 8. Light 21 can transmit in a single direction through surface 11 before illuminating photodetector 8. The path of light 21 can include surface 11. Surface 11 can be in the path of light 21 traveling from LED 5 to detector 8. The surface of photodetector 8 can be incorporated in surface 11. The surface of IC 9 can be incorporated in surface 11 using a method described in Murali, P. Izyumin, I. Prabhu, S. Cohen, D. Boser, B. (2014). A MAGNETIC FLOW CYTOMETER WITH INTEGRATED MICRO-FLUIDICS. 159-162. 10.31438/trf.hh2014.44. The surface of the IC can be the surface of photodector 8.

Surface 11 can be hydrophilic or coated with a hydrophilic reagent 31. Plasma 17 from whole blood 16 can flow on surface 11 into well 19 or into capillary 22. Plasma 17 can flow between surface 11 and filter 2 into well 19 or capillary 22. Plasma 17 can flow through filter 2 and through the edge 20 of filter 2 into capillary 22 and well 19. Plasma 17 on surface 11 can flow into capillary 22 of spectrophotometer 15 due to the low contact angle of plasma 17 on surface 11. Plasma on surface 11 can flow through capillary 22 and into well 19. Capillary 22 can be formed by the proximity of AOW 4 or IC 9 and surface 11. Capillary 22 can be formed between AOW 4 or IC 9 and surface 11. Plasma in surface capillary 22 can flow into well 19 by capillary action. Well 19 and capillary 22 can be fluidically connected such that plasma in capillary 22 can flow into well 19. Plasma 17 can fill well 19. Filter 2 can be fluidically connected to well 19 through surface 11 and surface capillary 22. Capillary 22 can be parallel to surface 11.

The edge 20 of filter 2 can be in proximity or in contact with AOW 4 or IC 9. Filter 2 can have a barrier 13 that can prevent red blood cells in whole blood 16 from passing through edge 20 onto surface 11 and capillary 22. Filter 2 can have a barrier 13 that can allow plasma 17 in whole blood 16 to pass through edge 20 onto surface 11 and capillary 22. The edge 20 of filter 2 can be in proximity or in contact with photodetector 15. The edge 20 of filter 2 can be in proximity or in contact with capillary 22. Filter 2 or edge 20 of filter 2 can be partially or completely inside capillary 22. Filter 2 can contain a barrier 13 and wherein barrier 13 can be inside capillary 22.

Barrier 13 can be a notch, depression, indent, hydrophobic barrier or any feature in filter 2 that can reduce or eliminate the passage of whole blood cells through or around edge 20 or around filter 2 into plasma 17. Barrier 13 can be a notch, depression, indent, hydrophobic barrier or any feature along edge 20 of filter 2. Barrier 13 can be manufactured by crushing filter 2 wherein blood cells are blocked from traveling through, over or under the crush region. The crush region can be less than 5 mm, 2 mm, 1 mm, or 0.5 mm or 0.25 mm from the edge of filter 2. Barrier 13 can be manufactured by crushing filter 2 along edge 20. The presence of whole blood cells in well 19 can interfere with the chemistry measurements. Barrier 13 can be a material blocking the movement of whole blood cells on, along or through edge 20 or filter 2. Barrier 13 can a physical dam or barrier on edge 20. Barrier 13 can slow, reduce or prevent whole blood cells from mixing with plasma 17 in gap 12, under filter 2 or in capillary 22. Barrier 13 can be on top of filter 2 and can prevent whole blood cells from passing through edge 20 or over the top of filter 2. Barrier 13 can be on filter 2 in proximity to edge 20.

Gap 12 can be the space between AOW 4 or IC 9 and filter 2. Gap 12 can be the space between AOW 4 or IC 9 and edge 20 of filter 2. Barrier 13 can reduce or eliminate blood cells from wicking through or over edge 20 into gap 12 or surface 11 or capillary 22 and ultimately into well 19. The length of gap 12 can be less than 5 mm, 2 mm, 1 mm, 0.5 mm, 0.2 mm, 0.1 mm, 0.05 mm, or 0.025 mm. The length of gap 12 can be defined as the distance between filter 2 and AOW 4 or IC 9. The gap 12 or barrier 13 can be used to control or slow down the flow of plasma into well 19 and promote mixing. Surface 11 adjacent to gap 12 can be hydrophilic such that plasma under filter 2 can sheet or flow across surface 11 adjacent to gap and into capillary 22 or well 19. There may be no material such as a filter or AOW or IC directly atop surface 11 over gap 12.

The length of gap 12 can determine time necessary for plasma under filter 2 to sheet or flow across surface 11 adjacent to gap 12. Surface 11 adjacent to gap 12 can be exposed. The length of gap 12 can be long enough to ensure proper mixing of dissolved reagents in plasma 17.

Light Emitting Diode

LED 5 can be mounted on surface 11, PCB 3 or PCB 62 using epoxy, tape, an electrical socket, wirebonds, bump bond or reflowed or soldered electrical connections. LED 5 can emit light 21 with narrow band optical spectrum centered on a peak frequency, namely the optical detection frequency 60. LED 5 can emit light 21 with a narrow band optical spectrum with a FWHM of less than 200 nm, 100 nm, 50 nm, 25 nm, 20 nm, 15 nm, 10 nm, 5 nm, 4 nm, 3 nm, 2 nm or 1 nm. Spectrophotometer 15 can be a single frequency spectrophotometer, wherein spectrophotometer 15 can produce or measure the intensity of light 21 at only one optical frequency, namely the optical detection frequency 60. Device 1 can contain a plurality of single frequency spectrophotometers. Each of the plurality of single frequency spectrophotometer can produce or measure the intensity of light at a different optical detection frequency. The plurality of single frequency spectrophotometers can contain plasma from the filter 2 of different filters. The plurality of single frequency spectrophotometers can be fluidically connected to filter 2 or different filters. The plurality of single frequency spectrophotometers can be fluidically connects the surface 11 or different surfaces. Device 1 can have multiple LEDs emitting at different optical detection frequencies. A plurality of LEDs can be mounted on the same surface 11, PCB 3 or PCB 62. A plurality of LEDs can be mounted on different flex PCBs.

LED 5 can emit light 21 with a wide angle emission profile. LED 5 can be packaged with a lens 57 to direct or concentrate light 21 towards for example an input lens of reflector 6.

LED 5 can be packaged using plastic or quartz or be a package-free bare die. LED 5 can be flipped chip bonded onto a PCB and the illumination can emit from the backside of LED 5, opposite the bonding pads. LED 5 can be chip-on-board mounted on a PCB. Plastic packages can degrade in UV light, but since device 1 is a single-use disposable, long term degradation of the LED package is not a concern. LED 5 can be a laser diode emitting a laser or coherent light.

LED 5 can be constructed of Aluminum Gallium Nitride (AlGaN) or Gallium Nitride (GaN) or both. LED can be constructed from typical LED materials known in the art. The substrate for LED 5 can be sapphire or silicon carbide or other more typical LED substrates known in the art. LED 5 constructed from AlGaN or GaN can emit with peak frequencies at 340 nm and 405 nm. LED 5 constructed from AlGaN or GaN can be low power and can be powered by a single battery.

The LED 5 can be flip chip bonded onto a PCB 3. PCB 3 can feature registration and the flip-chip bonding process can result in LED 5 positional errors. To overcome these errors, LED 5 can be placed on PCB 3 first and IC 9, AOW 4 and reflector 6 can be placed on PCB subsequently to LED 5 and registered to LED 5. In some cases, components will be mounted on the other side of the PCB. LED 5 can be registered to a through-feature like one or more vias or one or more edges of PCB 3, and IC 9, AOW 4 and reflector 6 can be registered to the same through-features.

Spectrophotometer 15 can be encased in an optical shield 82 that blocks light from the exterior from entering well 19. Optical shield 82 can be on device 1 in housing 44.

Array of Wells

The AOW 4 can comprise an array of 1 to 100 wells, in which the transmittance of plasma 17 with reporter molecule 56 can be measured. One or more AOW 4 can be mounted in proximity, above, below, on or laterally to surface 11, PCB 3 or IC 9. AOW 4 can be positioned in proximity, below, above, on, laterally to, adjacent to or in contact to filter 2 or edge 20 of filter 2, or barrier 13 of filter 2. AOW 4 can contain well 19. AOW 4 can be opaque to the optical detection frequency 60 to avoid signal cross talk among the wells. A single AOW 4 can be shared among multiple spectrophotometers. Reflector 6 can be over-molded onto AOW 4. AOW 4 can be constructed from standard injection molded plastics. AOW 4 can contain a pocket for the wirebonds of IC 9. AOW 4 can contain a pocket that crushes filter 2 and creates barrier 13. Capillary 22 can be formed in between AOW 4 or IC 9 and surface 11. AOW 4 can contain capillary 22.

Well 19 can be a capillary with parallel surfaces. The parallel surface of well 19 in the configuration of a capillary can be perpendicular to light 21, wherein light 21 enters through one parallel surface and exits through the parallel surface on the opposite side of the capillary. Light 21 can pass through capillary 22, wherein AOW 4 is constructed with material transparent to light 21.

Well 19 can have a maximum depth of 5 mm, 3 mm, 2 mm, or 1.5 mm, or 1 mm, or 0.75 mm, or 0.6 mm, or 0.5 mm, or 0.4 mm. Well 19 can have a maximum diameter of 2 mm, 1.5 mm, 1 mm, 0.75 mm, 0.5 mm, 0.4 mm, 0.3 mm or 0.25 mm. Well 19 can be cylindrical with drafted sidewalls.

The AOW 4 can be snap-fit, friction fit, heat staked, glued or adhered to surface 11. AOW 4 can be adhered to surface 11 with double-sided tape 10. AOW 4 can be machined or injection molded. AOW 4 can be manufactured from an injection moldable plastic such as Polymethylmethacrylate (PMMA), Acrylonitrile butadiene styrene (ABS) or hydrophilic polymers. AOW 4 can be transparent, translucid or opaque. AOW 4 can have mounting points or through holes for reflector 6. Surface 11 can have mounting points or through holes for AOW 4 and reflector 6. AOW 4 can have capillary draw texture on the inside of the wells.

The inner volume of well 19 can be less than 2 uL, or 1 uL, 0.5 uL, or 0.25 uL, or 0.1 uL of plasma 17. Well 19 can be vertical or positioned at an angle vis-a-vis surface 11. Well 19 can have tapered sidewall to promote capillary action.

Tape Design

Double sided tape 10 can be mounted on surface 11. The AOW 4 can be mounted above, below, on or laterally to tape 10. Filter 2 and filter 55 can be mounted above or below, on or laterally to tape 10. Filter 2 and AOW 4 can abut or be separated by a gap 12, wherein the surface 11 adjacent or nearest to gap 12 can be exposed or uncovered.

Tape 10 can contain between 1 and 100 slots or channels that can fluidically connect one or more filters with one or more wells in one or more AOWs, such that plasma 17 from the one or more filters can flow unassisted into one or more wells. Channel 25 in tape 10 can direct the plasma 17 from filter 2, across gap 12, into capillary 22 and into well 19. Capillary 22 can be formed by surface 11, AOW 4 and channel 24. Capillary 22 can be formed by surface 11, IC 9 and channel 25. Channel 25 can fluidically connect filter 2 to well 19. Slot 25 in tape 10 can direct the plasma 17 from filter 2 into well 19.

Channels 23 and 25 can be fluidically isolated from one another on surface 11 such that plasma in one channel cannot flow into another channel or plasma in one channel cannot mix with plasma from another channel. Plasma in channels 23 and 25 can have different dissolved reagents. Channel 23 can delineate a separate reaction chamber, where a distinct chemical reaction 35 can be performed. A channel can contact a plurality of wells to a single filter.

Double-sided tape 10 can be hydrophobic or hydrophilic. Tape 10 can be hydrophobic to avoid delamination after prolonged exposure to plasma 17. Also, the use of hydrophobic tape 10 can facilitate spotting of different surface reagents spotted in different slots by eliminating unwanted mixing. Tape 10 can be thin to minimize the dead volume of plasma 17 and therefore to reduce the amount of whole blood 16 needed to run device 1. The thickness of Tape 10 can be less than 1 mm, 0.1 mm, 0.05 mm, 0.025 mm or 0.01 mm. Multiple slots can connect to multiple fluidically isolated filters but channel multiple plasmas to the same AOW or to same well in AOW. Multiple slots can connect to a single filter 2.

Reflector

Reflector 6 can be composed of multiple optical elements. Optical elements can be optical splitters, optical combiners, mirrors, lenses, optical diffusers, passive optical amplifiers, apertures, fully or partially reflective surfaces, total internal reflective surfaces, waveguides and other features to control or direct light 21. The reflector 6 can be injection molded from an injection moldable plastic transparent to light 21. However, for directing shorter wavelength lights like 340 nm and 405 nm light, the material from which the light-pipe or waveguide is manufactured can be transparent or translucent to ultra-violet light, such as cyclic olefin copolymers or PMMA. The refractive index of reflector 6 can be higher, lower or within 10%, 20%, 30%, 50%, 100% of the refractive index of plasma 17.

A first optical element 28 can redirect light 21 approximately 90° from LED 5 to a second optical element 29. The second optical element 29 can redirect light 21 approximately 90° from the first optical element 28 into plasma 17 in well 19. The first or second optical elements can also split light 21, focus light 21 or change the radiation pattern of light 21. Reflector 6 can direct light 21 from one diode to a plurality of wells. Reflector 6 can direct the light from a plurality of diodes into a well 19.

Reflector 6 can have a protrusion 50. Protrusion 50 can act as a waveguide. Protrusion can contact plasma 17 in well 19. Protrusion 50 can penetrate well 19 or be mounted in well 19, on the opposite side of photodetector 8. Protrusion 50 can contain a lens 51 that focuses the light from LEDs 5 or 26 onto the bottom of well 19. Protrusion 50 in reflector 6 can channel or direct the light from second optical element 29, through lens 51 and into the plasma 17 in well 19. Lens 51 can also be flat or concave. Lens 51 can be convex to avoid bubbles being trapped underneath it when well 19 fills by capillary action from the bottom up. The center of lens 51 can be the first point on reflector 6 that touches plasma 17 as well 19 fills. Photodetector 8 can be exposed to light 21 from LED 5 that traverses from protrusion 50 or lens 51 directly into plasma 17 in well 19. Light 21 can exit protrusion 50 through lens 51. Lens 51 can form the tip of protrusion 50. Lens 51 can focus light 21 onto photodetector 8. Protrusion 50 and lens 51 can be mounted above well 19 or inside well 19. Protrusion 50 and lens 51 can be centered with respect to well 19. Protrusion 50 or lens 51 can contact plasma 17 at one end of well 19, opposite photodetector 8. Protrusion 50 or lens 51 can contact the sidewalls of well 19 opposite photodetector 8. A vent 52 can be formed between the protrusion 50 or lens 51 and the sidewall of well 19. Vent 52 can allow air inside well 19 to exit out of well 19 to maintain capillary action in well 19. Protrusion 50 and lens 51 can be in proximity to well 19 without contacting well 19. The minimal distance between protrusion 50 or lens 51 and the sidewall of well 19 can be less than 1 mm, 0.5 mm, 0.25 mm, 0.1 mm, 0.05 mm, 0.025 mm, 0.01 mm, 0.005 mm, or 0.001 mm. The vent 52 can be an annulus around the top rim of well 19.

Lens 51 or protrusion 50 can be above plasma 17 or well 19 and avoid contacting them. Lens 51 can focus light onto the aperture of well 19 opposite photodetector 8. The aperture of well 19 opposite the photodetector 8 can be reduced to minimize the optical interference of the meniscus of the plasma 17 on the illumination of photodetector 8. The diameter of the top aperture of well 19 can be less than 2 mm, 1.5 mm, 1 mm, 0.75 mm, 0.5 mm, 0.4 mm, 0.3 mm, 0.2 mm, or 0.1 mm. The sidewalls of well 19 can be drafter to improve capillary flow, eliminate light reflecting off the sidewalls and to reduce the diameter of the top aperture of well 19. The diameter of the aperture of well 19 opposite photodetector 8 can be smaller than the diameter of the aperture of well 19 closest to photodetector 8.

Protrusion 50 and lens 51 can be used for underfill and overfill control. The assay measurement can begin when plasma 17 contacts lens 51 or protrusion 50. The amount of light that reaches photodetector 8 can increase, decrease or change abruptly when plasma 17 contacts lens 51 or protrusion 50. The change in the amount of light on photodetector 8 when plasma 17 contacts lens 51 or protrusion 50 can be detected and used to begin the assay measurement in well 19. The assay measurements in different wells can begin at different times. The change or lack of chance in the amount of light that reaches photodetector 8 when plasma 17 contacts lens 51 or protrusion 50 can be used to indicate under-fill situations where not enough sample was applied to filter 2.

Reflector 6 can have a third optical element 53 to collect, focus or split light directly from LED 5, wherein LED 5 can be unpackaged and emit light across a wide angular pattern.

Housing

Device 1 can also include a desiccant 43, a display 41 and one or more batteries 40 to provide power to LED 5, IC 9 and display 41. Display 41 and battery 40 can be electrically connected to IC 9. Display 41 and battery 40 can be electrically connected to PCB 3. The device 1 can include a plastic housing 44 to encase device 1 and all the sub-components. The housing 44 can have branding and test identifiers and a QR code printed or molded on its exterior. Device 1 can have a button 45 or a pull tab 61 to activate device 1. Display 41 of device 1 can prompt a user to apply a drop of whole blood 16 on filter 2. Display 41 can display the results of a chemistry test. Display 41 can display to the use such are over-sampling or under-sampling situations, the time remaining until the assay is complete, error codes or other information.

Device 1 can also have a sample capillary 14 that collects whole blood 16 from a finger, pipette or syringe and wicks it to multiple filters, such as filter 2 and filter 55. Device 1 can be configured to accept less than 15 uL of whole blood, or less than 10 uL of whole blood or less than 5 uL of whole blood. The results from the measurement from device 1 can be displayed on display 41 or wirelessly transmitted to a nearby wireless device. Device 1 can have a near-field communication (NFC) wireless module. In the cases where the change in amount of the optical density of the light transmitted through the plasma 17 changes quickly, device 1 can report results as soon as they are available. Results can be reported in less than 15 minutes, or less than 10 minutes, or less than 5 minutes, or less than 3 minutes, or less than 1 minute. Digital display 41 can be a liquid crystal display (LCD), a dot matrix display, an organic LED (OLED) display, an e-ink display or other displays. Display 40 can display the concentration of one or more analytes 36. Battery 40 can power spectrophotometer 15 and display 41. Spectrophotometer 15 can comprise an integrated circuit (IC) 9. Device 1 can have a single PCB 3. PCB 3 can be a 2 layer PCB.

Device 1 can be integrated into a blood collection system that is fitted onto a patient and take whole blood from the patient. Device 1 can be integrated into the blood collection system and can take whole blood from the blood collections system for analysis. The blood collection may or may not have an LCD to display the assay results. The assay results can be transmitted wirelessly to a nearby mobile device. Battery 40 can be a coin cell battery. Battery 40 can be a single coin cell battery.

Other Sensors

Device 1 can have additional detection ICs. The additional detection ICs can be integrated on PCB 3, or on AOW 4. An additional detection IC can be an electrochemical IC containing electrochemical sensors that can function either in plasma or whole blood. Platinum electrodes and permselective films can be patterned on a separate electrochemical IC to enable electrochemical sensing on device 1. Ion selective electrodes (ISE) can be integrated in the electrochemical IC. ISE can be used to quantify electrolytes such as sodium, potassium and chloride. An additional detection IC can be an immuno-assay IC. An immuno-assay IC can be a magnetic sensing IC 83 that performs magnetic particle labeled immuno-assays, wherein magnetic particles conjugated to antibodies can capture soluble target proteins in plasma 17. The magnetic particles can sediment via gravity to the antibody coated surface of the magnetic sensing IC to which they can bind strongly in the presence of the target proteins. Magnetic sensing IC 83 can integrate current carrying conductors adjacent to magnetic particle sensors. The current carrying conductors can remove magnetic particles weakly bound to the surface of the magnetic sensing IC 83 from atop the magnetic particle sensors, while the magnetic particles sensors can detect magnetic particles that remain strongly bound to surface of the magnetic sensing IC above magnetic particle sensors. Magnetic particles can loaded and stored in a dry state in a well. Plasma 17 can rehydrate and release the dried magnetic particles which incubate with plasma 17, capture the target proteins and sediment to the surface of the magnetic sensing IC. The magnetic particles can be dried in a filter or in a capillary. The magnetic particles can be dried on the bottom of a filter. The magnetic particle sensors can be implemented as photodetectors 8 or as magnetic sensors embedded in the magnetic sensing IC 83. Device 1 can contain multiple IC 9, additional detection ICs to perform chemistry tests and to perform immuno-assays. Device 1 can contain one or more IC 9, one or more electrochemical ICs and one or more magnetic sensing ICs. Electrochemical IC and magnetic sensing IC 83 can be integrated on or parallel or flush with PCB 3. IC 9, electrochemical IC and magnetic sensing IC can have digital interfaces for communication like I$^2$C or SPI. One IC in device 1 can be the master IC. IC 9 can be the master IC. The master IC can contain the processor, the memory, the power management. The master IC can communicate and coordinate with all other IC in device 1.

Sample

Sample 18 can be applied on filter 2. Filtrate 24 can be sample 18 filtered through filter 2. Filtrate 24 can containing dissolved reagents 33. Filtrate 24 can flow through filter 2 and onto surface 11. Filtrate 24 can flow on surface 11 as a result of hydrophilic reagents 31 or as a result of the hydrophilicity of surface 11. Filtrate 24 can flow or sheet or wick across surface 11. Filtrate 24 can flow or sheet or wick across gap 12 into capillary 22. Filtrate 24 can flow through surface capillary 22. Filtrate 24 can fill well 19. Protrusion 50 or output lens 51 can contact filtrate 24. Cover 64 can contact filtrate 24. Spectrophotometer 15 can measure the absorbance of filtrate 24 in well 19. Plasma 17 is one example of filtrate 24, wherein sample 18 is whole blood 16. Spectrophotometer 15 can measure the absorbance of fluid in well 19. Filtrate 24 can be defined as any fluid in well 19.

Sample 18 can be whole blood, serum, plasma, saliva, mucus, pulmonary fluid, feces, cerebral fluids, oral swab collections, nasal swab collections, pulmonary lavages, nasopharyngeal swab collections, gum scrapings or other fluids or secretions, dilutions, elutions, or dissolutions thereof.

Device 1 can be used for detecting or measuring multiple types of analytes 36. Analyte 36 can be one or more Ribonucleic acid (RNA) or Deoxyribonucleic acid (DNA) oligonucleotides 110, one or more antibodies 111 or proteins 112, general chemistry biomarkers or electrochemistry biomarkers. The presence of oligonucleotides 110 can be indicative of the presence of an active infection of one or a plurality viruses. The titers or the presence of one or a plurality of antibodies 111 can be indicative of one or more past infections of one or more viruses. Device 1 can detect the presence of one or more oligonucleotides 110 in sample 18. Device 1 can detect the presence or measure the titer of one or more antibodies 111 or proteins in sample 18.

Reader Implementation

One or more devices 1 can be inserted into or used with a reader 100. Reader 100 can contain a port 101, a battery 104, a digital display 105, an NFC module 106, a LED 109 and a photodetector 113. Reader 100 can have a plurality of ports, LEDs and photodetectors. Reader 100 can contain a plurality of ports 101 for inserting one or more device 1. Battery 104 can be electrically connected to display 105, NFC Module 106 and LED 109. LED 109 can emit light 21 with a narrow band spectrum centered on the optical detection frequency 60. Light 21 from LED 109 can traverse well 19 on device 1. Light 21 can be incident on photodetector 113. Reader 100 can measure the absorbance of the filtrate 24 in well 19 in device 1. Display 105 can display the absorbance, concentration or activity measurements from device 1 or reader 100. NFC Module 106 can communicate with NFC module 42. Reader 100 or port 101 can accept one or a plurality of devices 1, simultaneously or in series.

Reader 100 can be disposable or reusable. Reader 100 can contain a heater 102 and a temperature sensor 108 for maintaining a constant reaction temperature in well 19, for isothermal amplification or general chemistry reactions. Reader 100 can have a plurality of heaters for heating a plurality of devices to different temperatures. Heater 102 and temperature sensor 108 can be electrically connected to battery 104 or the power management system. Heater 102 can be part of a thermocycler for running a polymerase chain reaction (PCR). The reader 100 can contain a fan, for convective heating or cooling. The reader 100 can have a heat sink or a heater 102 with high surface area to increase heat transfer to air or coolant. The fan and the heat sink can decrease the time necessary to heat or cool the filtrate in well 19 in device 1 to a desired reaction temperature.

Reader 100 can retrieve absorbance, concentration or activity measurements from device 1 inserted in port 101. Reader 100 can retrieve absorbance, concentration or activity measurements from device 1 in proximity to reader 100. Reader 100 can measure the absorbance of the sample 18 or filtrate 24 or plasma 17 in well 19 in device 1. Reader 100 can measure the transmittance of the sample 18 or filtrate 24 or plasma 17 in well 19 in device 1. Reader 100 can measure the reflectance of the sample 18 or filtrate 24 or plasma 17 in well 19 in device 1. Reader 100 can measure the reflectance of the sample 18 or filtrate 24 or plasma 17 in in contact with reflectance surface 81.

Reader 100 or port 101 can contain a digital connector to connect and communicate with device 1. Reader 100 or port 101 can contain an RFID transceiver or NFC module that can connect or communicate with the NFC module in device 1. Reader 100 or port 101 can contain a camera, image sensor or photodetector that can read display 41 or the output of device 1. Reader 100 or port 101 can be configured to allow light 21 from an LED 109 integrated on reader 100 to pass through well 19 on device 1. Reader 100 or port 101 can be configured to allow light 21 from an LED 109 integrated on reader 100 to reflect off reflectance surface 81 and be incident on photodetector 113. Reader 100 or port 101 can be configured to allow light 21 to pass through well 19 on device 1 and to be incident on photodetector 113 integrated on reader 100. Reader 100 or port 101 can contain one or a plurality of windows, openings or apertures 116 that can allow all or a fraction of light 21 to pass from LED 109 through well 19 and into photodetector 113. Aperture 116 can be a hole in material opaque to light 21. The hole or aperture 116 can be smaller than 2 mm, 1 mm, 0.75 mm, 0.5 mm, 0.4 mm, 0.3 mm or 0.25 mm in diameter. Aperture 116 can be any shape.

Reader 100 or port 101 can operate at one or two or three or more optical detection frequencies 60. Different ports in reader 100 can operate at different optical detection frequencies 60. Reader 100 can be configured such that devices operating at one optical detection frequency 60 may not be inserted into a second port that operates at another optical detection frequency. Reader 100 can have a reflector 114 that can redirect light 21 from LED 109 through a plurality of wells 19 and onto one or a plurality of photodetectors 113. Reflector 114 can redirect light 21 from LED 109 through a plurality of wells 19 in a plurality of devices 1 and onto one or a plurality of photodetectors 113. Reader 100 can have a plurality of identical LEDs 109 wherein light from one LED 109 traverses one or more wells on device 1. Reader 100 can have a plurality of LEDs 109 emitting light 21 with different optical detection frequencies 60. Reader 100 can have a plurality of photodetectors 113 wherein each photodetector 113 can detect light 21 passing through one or more wells 19 in one or more devices 1. Reader 100 can have an optical diffuser 115 to provide uniform illumination into one or more wells on device 1, or through one or more wells on a plurality of devices 1. Aperture 116 can be above, below or lateral to device 1 and well 19. A plurality of apertures 116 can be in proximity to device and well 19. Two apertures can be on either side of well 19. Photodetector 113 can be bigger or smaller than aperture 116. Diffuser 115 can be bigger or smaller than aperture 116. Aperture 116 can be bigger or smaller than the diameter or aperture of well 19. The difference between the amount of power of light 21 transmitted through well 19 and well 7 can be less than 20%, 15%, 10%, 8%, 7%, 6%, 5%, 4%, 3%, 2%, or 1%. The difference between the amount of power of light 21 transmitted through well 19 containing a control sample from a first device 1 and the amount of power of light 21 transmitted through well 19 containing a control sample from a second device 1 can be less than 20%, 15%, 10%, 8%, 7%, 6%, 5%, 4%, 3%, 2%, or 1%. Reader 100 can perform rate or endpoint absorption measurements of chemical reaction 35 in well 19.

Reader 100 can have blinds 121 positioned between each well 19 to optically isolate the wells from one another. Reader 100 can have blinds 121 positioned between each LED 109 to optically isolate the LEDs from one another. Reader 100 can have blinds 121 positioned between different paths of light 21 to optically isolate the different light paths from one another. The blinds 121 can contact device 1 or well 19. The blinds 121 can be in proximity to device 1 or well 19. Cross illumination can occur wherein light 21 intended to pass through one well passes through an adjacent well. Cross illumination can occur wherein light intended to be incident on one photodetector is incident on an adjacent photodetector. Reader 100 can correct for cross illumination numerically. Reader 100 can contain one LED per well, wherein the pitch of the LEDs is approximately equal to the pitch of the wells. Reader 100 can employ one photodetector per well, wherein the pitch of the photodetectors is approximately equal to the pitch of the wells.

Reader 100 or port 101 can have blinds between wells, wherein the pitch of the blinds is approximately equal to the pitch of the wells. Reader 100 or port 101 can contain one aperture per well, wherein the pitch of the apertures is approximately equal to the pitch of the wells. Reader 100 or port 101 can contain two apertures per well, on either side of the well, wherein the pitch of the apertures is approximately equal to the pitch of the wells. Reader 100 can power a plurality of LEDs 109 at one time, or reader 100 can power a plurality of LEDs 109 in sequence.

Reader 100 can communicate to clinic or hospital information system. Reader 100 can be connected physically or wirelessly to the clinic or hospital information system. Devices 1 can communicate with each other or to reader 100 via I2 C, SPI, RFID or other digital interfaces. Devices can communicate with each other via the reader. The reader can connect to other readers. Multiple readers connected together can share a single power source or power supply. The power source could be battery 104 or a power outlet connection. Multiple readers connected together can share a single connection to the clinic or hospital information network. Reader 100 can have a case that can contain slots to connect to other readers. The case can contain electrical leads for supplying power and information. Reader 100 can be a mobile device such as a laptop, tablet or phone.

Reader 100 or port 101 can have physical registrations points or features to hold device 1 at a preset position with respect to reader 100 or port 101. Device 1 can have physical registrations points or features to align device 1 at a preset position with respect to reader 100 or port 101. Reader 100 can have features so device 1 can be securely inserted into or removed from port 101. Reader 100 or port 101 can have a mechanical slide or mechanical guide to insert and remove device 1 from port 101. The mechanical guide can assist inserting device 1 in port 101 or reader 100. The shape of port 101 can be complementary to the shape of device 1. Port 101 can have a swinging or sliding door through which device 1 can be inserted. The door on port 101 can block light from entering inside port 101. The position of device 1 inserted into port 101 can vary less than 250 µm, 100 µm, 50 µm, 25 µm, 10 µm, 5 µm from a nominal position.

The reader 100 can detect if device 1 is inserted in port 101. The reader 100 can contain detection apparatus wherein the detection apparatus can detect when device 1 is inserted in port 101. The reader can use LED 109 and the photodetector 113 to detect the presence of device 1 at or near a nominal position in port 101. The amount of light 21 from the LED 109 incident onto the photodetector 113 can indicate whether device 1 is inserted in port 101 at or near a nominal position.

Cartridge Implementation

Surface 11 can be transparent. Surface 11 of device 1 can be constructed from a plastic transparent to light 21. Surface 11 can be glass or plastic and can be coated with a protein adhesion layer. Surface 11 can be perpendicular to the path of light 21 from LED 109 or LED 5 to photodetector 8 or photodetector 113. Light 21 can be incident on surface 11. Surface 11 can transmit light 21.

Well 19 can have two opposing flat inner surfaces that transmit light 21. Light 21 can travel perpendicularly through two surfaces that form inner surface of well 19. Surface 11 can be an inner surface of well 19. Cover 64 can be an inner surface of well 19. The two opposing inner surfaces can have different shapes. One inner surface can be the output lens 51. Another inner surface can be surface 11. Light 21 from LED 109 can be redirected by reflector 114 or reflector 6, incident on one or more inner surfaces of well 19 and incident on photodetector 113. The AOW 4 can be transparent or opaque. The cross-sectional top view of well 19 can be circular, rectangular or any other shape. The cross-sectional side view of well 19 can be circular, rectangular or any other shape.

Light 21 can traverse well 19 in device 1 laterally to avoid bubbles generated by heating or by imperfect capillary flow. Bubbles in well 19 can percolate to the top of well 19. Light 21 can traverse laterally through well 19 below the bubbles. Wells on the same device 1 or well on different devices can be in different orientations. The path of light taken by light 21 through the filtrate 24 in well 19 can be vertical. The path of light taken by light 21 through the filtrate 24 in well 19 can be horizontal or lateral. Control wells can be used to determine the background signals for device 1. Control wells can be used to determine the background signals for device 1 for filtrate 24 or plasma 17. Control wells can be used as one point in an endpoint measurement. The results from reader 100 or device 1 can be qualitative, indicating the presence or absence of one or more analytes.

A vial 103 can be mounted to AOW 4, surface 11, filter 2, tape 10 or other feature on device 1. The vial 103 can be twisted, popped, pushed, friction fit onto AOW 4, surface 11, filter 2, tape 10 or other feature on device 1. Vial 103 can have a seal on the bottom configured to open and release the contents of vial 103 when vial 103 is mounted, twisted, popped, pushed or friction fit. A user can add a sample 18 into vial 103. Sample 18 in vial 103 can be mixed and diluted. A user can mount vial 103 on device 1. Vial 103 can contain a buffer or diluent necessary for running reaction 35. The vial 103 can contain dried reagents. The vial 103 can have a lid that a user need to remove to add sample 18 or a swab of a sample 18. Vial 103 can contain a buffer solution or diluent for diluting one or more samples 18 or whole blood 16. Filter 2 below vial 103 can be a porous material impregnated with filter reagents 32.

Immunoassay Detection

Reader 100 can read a lateral flow strip. The results from the lateral flow strip can be interpreted visually by reader 100. Reader 100 can contain one or a plurality of optical detectors, photodetectors, imaging system or cameras to detect and measure the test and control lines of a lateral flow strip. A lateral flow strip can be inserted into port 101. Device 1 can contain a magnetic sensing IC 83 and can use magnetic particles to bind to antibodies to one or more viruses. Magnetic sensing IC 83 can be integrated into IC 9. Device 1 or magnetic sensing IC 83 can contain a surface 11 onto which magnetic beads can bind specifically. Reader 100 can contain one or more magnets 117 that can be configured to generate the magnetic forces to remove the non-specifically bound magnetic particles from surface 11. Magnet 117 can be a permanent magnet or an electromagnet. Reader 100 can have a linear motion system to move magnet 117 in proximity to well 19. Reader 100 can have a swing arm to move magnet 117 in proximity to well 19. Magnet 117 can be stationary in reader 100 and device 1 can be mobile.

Device 1 can be moved in proximity to magnet 117. Magnet 117 can be above, below or to the side of device 1 and well 19. Magnet 117 can be in proximity to well 117. Magnet 117 can be above well 19 and pull non-specifically bound magnetic particles up off surface 11. Magnet 117 can be positioned laterally to well 19 and pull non-specifically bound magnetic particles up laterally across surface 11. Reader 100 can contain an imaging system 118 to detect, count, estimate or measure the number of magnetic particles are specifically bound to surface 11. The imaging system 118 can use direct illumination, backlit illumination or total internal reflection to detect the magnetic particles that can be specifically bound on surface 11. The imaging system 118 can use near-field or far-field optical detection of the magnetic particles on surface 11. Imaging system 118 can have pixels to detect magnetic particles. Surface 11 can adhere to antibodies or antigen or be coated with an adhesion layer that can adhere to antibodies or antigen. Antibodies and antigens can be bound to the adhesion layer. The adhesion layer can be a thin layer of gold coated or deposited on surface 11 of the magnetic sensing IC 83. The surface of magnetic sensing IC 83 can be surface 11. The wells in device 1 can be placed vertically or effectively vertically such that magnetic particles can settle to surface 11 due to gravity.

Magnetic particles can be pulled towards surface 11 by a permanent magnet or electromagnet.

The magnetic sensing IC 83 can be manufactured on a wafer. A thin layer of gold acting as the protein adhesion layer can be deposited directly onto the magnetic sensing IC wafer through vacuum, electron beam or sputtering deposition. The pads can be protected with a shadow mask. A protective layer can be applied to the gold layer prior to wafer dicing, and can be removed prior to coating with antibodies and antigen. Alternatively, antibodies and antigen can be coated directly onto the protein adhesion layer on magnetic sensing IC wafer. The pads of the magnetic sensing IC 83 can be protected with photoresist during the protein adhesion layer deposition or the antibody or antigen coating processes. The proteins can be protected using photoresist during the wafer dicing process.

The surface or the adhesion layer or surface 11 can be coated with one or more viral antigens or with antibodies against a virus. Device 1 can perform a sandwich capture immunoassay or a competitive immunoassay. Magnetic particles can be dried in filter 2 or prefilter 59 or on surface 11 or the surface of lens 51. The surface 11 or adhesion layer can be coated with angiotensin converting enzyme 2 (ACE2) proteins. More than one surfaces or regions of the same surface 11 of device 1 can be coated with different epitopes of the ACE2 protein. The surface or adhesion layer can be coated one or more spike proteins (S proteins). A plurality of surfaces or regions on one surface can be coated with different S proteins that bind to different regions of ACE2. Device 1 can detect or measure the presence of virus proteins in a sample, or device 1 can detect or measure the presence of antibodies to the virus in the sample.

Device 1 can detect multiple different isotypes from a sample, for example, Immunoglobulin G (IgG) and Immunoglobulin M (IgM) specific to a strain of a virus. Device 1 can detect multiple strains of a virus in a simplex format, wherein the presence of any of the strains yields a positive. Device 1 can detect multiple strains of a virus independently in a multiplexed format. Device 1 can detect different isotypes in a simplex format wherein the presence of any of the isotypes yields a positive. Device 1 can detect different isotypes individually in a multiplexed format. Chemical reaction 35 can be an antibody antigen binding reaction.

The magnetic particles can be dried on the surface of protrusion 50, lens 51 or cover 64. Magnetic particles coated with a plurality of proteins can be loaded on a plurality of filters, wells, surface or lenses. Each filter or well can have magnetic particles coated with one type or set of proteins, wherein multiplexed assays can be performed in a plurality of wells. Magnetic particles coated with a plurality of proteins can be loaded on a plurality of locations on surface 11. Each location on surface 11 can have magnetic particles coated with one type or set of proteins, wherein multiplexed assays can be performed in a plurality of wells. Magnetic particles coated with a plurality of proteins can be loaded on a plurality of wells or output lenses. Each well can have magnetic particles coated with one type or set of proteins, wherein multiplexed assays can be performed in a plurality of wells.

Oligonucleotide Detection

Chemical reaction 35 can be an amplification chemical reaction. Device 1 can perform an amplification chemical reaction. An amplification chemical reaction can amplify RNA or DNA, through reverse transcriptase loop mediated isothermal amplification (RT LAMP), loop mediated isothermal amplification (LAMP), or other forms of isothermal amplification, Polymerase Chain Reaction (PCR) or Real Time (RT) PCR. The product or reactant of the amplification chemical reaction can contain a reporter molecule 56 that can be detected and their concentration measured spectroscopically by spectrometer 15 or by reader 100. Device 1 can contain amplification reagents 120 in a wet or dry state. The amplifications reagents 120 can comprise primers, polymerase enzymes, detergents and drying excipients. The amplification reagents can be in the vial, prefilter reagents 54, filter reagents 32, surface reagents 30, additional reagents 37 or diluent reagents 119. The amplification reagents 120 can be dried. The diluent in vial 103 can have diluent reagents 119 necessary to perform an isothermal amplification chemical reaction. The diluent in vial 103 can have diluent reagents 119 necessary to perform a chemical reaction 35.

The sample 18 can be mixed with the diluent and diluent reagents 119 and introduced onto the filter 2 or prefilter 59. The filtrate 24 can enter well 19. The IC 9 can heat well 19 to the needed isothermal amplification temperature, like 65, 70, 75, 80 degrees Celsius or other temperatures. A separate heater on device 1 can heat well 19 to the needed isothermal amplification temperature, like 65, 70, 75, 80 degrees Celsius or other temperatures. The reader 100 can have a heater 102. Reader 100 or heater 102 can heat well 19 to the needed isothermal amplification temperature, like 65, 70, 75, 80 degrees Celsius or other temperature. The amplification temperature can be thermocycled to perform PCR.

For well inner volumes exceeding 1 µL, a plurality of ICs with a single well 19 can be integrated into and co-planar with PCB 3.

Communication

Device 1 can have a near field communication (NFC) module 42 to communicate with reader 100, a mobile device or a laboratory information interface. The NFC module 42 can comprise an antenna and a transceiver IC. The antenna and transceiver IC can be mounted on PCB 3 or can connect to PCB 3. The antenna can be formed by traces on PCB 3. The antenna can be printed on or adhered to the bottom side of top housing 91. The antenna can be printed on or adhered to the top side of the bottom housing 92. The antenna can be electronically connected to NFC module 42. IC 9 can be electrically connected to NFC module 42. IC 9 can integrate the transceiver IC. Device 1 can transmit or receive assay information via the NFC module 42. Stored information can comprise assay information. Assay information can be the serial number of device 1, the time needed for device 1 to analyze sample 18, the time and date, the species of animal providing the sample, the age of the patient or animal. Assay information can be the measurements results or error codes resulting from device 1 analyzing sample 18 or whole blood 16. NFC module 42 can contain non-volatile memory. The non-volatile memory on NFC module 42 can store assay information or stored information. The non-volatile memory on NFC module 42 can store the program to control device 1. The program to control device 1 can be transferred from NFC module 42 to IC 9. IC 9 can process assay information stored in the non-volatile memory on NFC module 42. IC 9 can communicate with NFC module 42 via I2 C, SPI, RFID or other serial or parallel digital interfaces.

Device 1 can be in a powered off state until the NFC module 42 is activated. The NFC module 42 can activate or turn on the power to device 1. NFC module 42 can activate or turn on the power to IC 9. NFC module 42 can activate or turn on the power to the power management or the power control system for device 1. The NFC module can be in a power down state. The NFC module can be activated or turned on by the proximity of another NFC module. Device 1 can be activated or turned on by bringing another NFC module in proximity. Device 1 can be activated or turned on by the proximity of another NFC module. Device 1 can be activated or turned on by a radio frequency signal. Device 1 can have an electronic latch that changes state in proximity to another NFC transceiver. Device 1 can have an electronic power switch that changes state in proximity to another NFC transceiver. NFC module 42 can change the state of an electronic power switch. NFC module 42 can be integrated on IC 9. The electronic latch and power switch and the power management or power control system can be integrated on IC 9.

Device 1 can have an indicator LED to inform the user the state of the device. The indicator LED can be on, off, and it can be modulated between on and off in a pattern. The state and the pattern of the indicator LED can represent the state of device 1. The state of device 1 can be off, on, awaiting sample, processing sample, requesting more sample, analysis complete and error.

Optic Cavity

Reflector 6 can be mounted on AOW 4 using an optic tape 67. Optic tape 67 can be a double sided tape. Between reflector 6 and AOW 4 there can be a channel or vent 68 to let air or filtrate pass. There can be a plurality of vents 68. There can be one vent 68 for every well 19 on AOW 4 in device 1. One or a plurality of surfaces of the vent 68 can be hydrophobic or coated with a hydrophobic reagent. One or a plurality of surfaces of the vent 68 can be hydrophilic or coated with a hydrophilic reagent. Vent 68 can resist the flow of filtrate 24 or plasma 17. Vent 68 can promote the flow of filtrate 24 or plasma 17.

Evaporation can be a big problem for the reaction 35 as it can force accumulation of the reporter molecule 56 in filtrate 17. Vent 52, vent 68 or surface capillary 22 can be lengthened to eliminate or reduce mass transport of air or water or reporter molecule 56. Vent 52, vent 68 or capillary 22 can be longer than 1 mm, 2 mm, 3 mm, 4 mm, 5 mm, 6 mm, 7 mm, 8 mm, 9 mm or more than 10 mm. One metric for reducing mass transport is length divided by cross-sectional area. The length divided by the cross-sectional area of vent 52, vent 68 or capillary 22 can be greater than $100*m-1$, $1000*m-1$, $10000*m-1$, $100000*m-1$, $1000000*m-1$, or $10000000*m-1$.

Cover 64 can have a protrusion 50 and a lens 51 that can contact the plasma 17 or filtrate 24 in well 19 first to avoid the creation of bubbles. Cover 64 can be the output lens 51 of reflector 6. Cover 64 or reflector 6 can have an optical cavity 69. An optical cavity 69 can be a pocket of air between reflector 6 and AOW 4 or between cover 64 and AOW 4. Optical cavity 69 can be formed by optical tape 67. The optical cavity 69 can be a light guide that guides or concentrates light 21 to the output lens 51. The optical cavity 69 can be a light guide that guides or concentrates light 21 from an optical element in reflector 6 to the output lens 51. Optical cavity 69 can have a conical shape 70. Conical shape 70 can be above well 19 and lens 51. Light 21 can pass through conical shape 70 before lens 51 or well 19. The conical shape 70 can concentrate light 21 onto output lens 51. The conical shape 70 can direct light 21 that is not incident on output lens 51 away from the aperture at the top of well 19. The conical shape 70 can reduce or eliminate the amount of light 21 entering well 19 that is not incident on output lens 51. The conical shape 70 and output lens 51 can minimize the variation in path length 39. Output lens 51 can be flat. Cover 64 can have an optical cavity 69 with a conical shape 70 and an output lens 51. The optical cavity 69 can eliminate the existence on bubbles between the output lens 51 and the filtrate 24 or plasma 17 in well 19. The optical cavity 69 can permit output lens 51 to contact plasma 17 or filtrate 24 in well 19 and can prevent plasma 17 or filtrate 24 in well 19 from wicking into optical cavity 69. Optical cavity 69 can be a fluidic stop gap that can prevent plasma 17 or filtrate 24 in well 19 from flowing into optical cavity 69 or into vent 68. The inner surface of optical cavity 69 can be hydrophobic or coated with a hydrophobic coating to avoid condensation from plasma 17 or filtrate 24 in well 19. The inner surface of cavity 69 can be polished to reduce or avoid condensation from plasma 17 or filtrate 24 in well 19. The inner surface area of cavity 69 can be minimized to reduce or avoid condensation from plasma 17 or filtrate 24 in well 19. Reflector 6 can be constructed from a hydrophobic material.

Filter Module

Filter 2 and prefilter 59 can be laminated into a filter module 71. Filter module 71 can comprise a filter 2, a prefilter 59 and one or a plurality of lamination surfaces 84. Prefilter 59 can be a porous membrane impregnated with prefilter reagents 54. Prefilter 59 can touch or crush filter 2 to ensure proper flow of sample 18, whole blood 16, plasma 17 or filtrate 24 from prefilter 59 into filter 2. Prefilter 59 can be fluidically connected to filter 2. Prefilter 59 can have larger or smaller pore size than filter 2. Prefilter 59 can have similar pore size to filter 2. Filter 2 or prefilter 59 can block red blood cells from passing while allowing plasma 17 to pass.

Filter module 71 can comprise one or a plurality of sample bypass stops 84. A sample bypass stop 84 can be a feature that restricts or blocks the passage of whole blood 16 or sample 18 from inlet 66 into surface capillary 22 without traversing filter module 71 or filter 2. A sample bypass stop 84 can be a feature that ensures passage of whole blood 16 or sample 18 through filter module 71 or filter 2. A sample bypass 84 can be gap 12, barrier 13 or a notch in filter 2 or prefilter 59. Filter 2 and prefilter 59 can be laminated on a lamination surface 84. Lamination surface 84 can be a pressure sensitive adhesive, a transfer adhesive, or other flat material.

Lamination surface 84 can adhere to filter 2 or prefilter 59 and hold them in contact with each other. Lamination surface 84 can be placed flat on surface 11, PCB 3 or tape 10.

Lamination surface 84 can be a sample bypass stop 84. Lamination surface 84 can be hydrophobic. The backing of lamination surface 84 can be hydrophobic. Lamination surface 84 can have portions that are hydrophobic. Lamination surface 84 can have an adhesive that is hydrophobic such as a silicone adhesive. Lamination surface 84 can have a cut edge that is hydrophobic. One or a plurality of edges of lamination surface 84 can be aligned with one or a plurality of the edges of filter 2 or prefilter 59. Lamination surface 84 can have a thickness. The thickness of lamination surface 84 can be greater than 5 µm, 10 µm, 15 µm, 25 µm, 50 µm, 100 µm, 200 µm or 500 µm. The thickness of lamination surface 84 can be less than 5 µm, 10 µm, 15 µm 25 µm, 50 µm, 100 µm, 200 µm or 500 µm. Lamination surface 84 can be placed in between surface 11 or tape 10 and filter 2 or prefilter 59. Lamination surface 84 can prevent the sample 18 in filter 2 or prefilter 59 from flowing onto or contacting surface 11 or tape 10. Lamination surface 84 can block, control or reduce sample bypass.

Filter module 71 can have two or more lamination surfaces. Filter module 71 can have a first lamination surface 84 on the bottom and a second lamination surface 85. Lamination surface 85 can be positioned on the top of filter module 71. Lamination surface 85 can be a sample bypass stop. Lamination surface 85 can promote passage of sample 18 or whole blood 16 laterally through filter 2 or prefilter 59. Lamination surface 85 can promote incubation of sample 18 or whole blood 16 with filter reagents 32 or prefilter reagents 54. The dimensions of lamination surface 85 can modulate the amount of sample 18 and whole blood 16 incubate with filter reagents 32 or prefilter reagents 54. Lamination surface 85 can reduce or eliminate passage of sample 18 or whole blood 16 over or around filter 2 or prefilter 59. Lamination surface 85 and lamination surface 84 can overlap across a section of module 71 to ensure sample 18 or whole blood 16 wick laterally through filter 2 or prefilter 59 and dissolve the appropriate amount of filter reagents 32 or prefilter reagents 54. A portion of filter 2 or prefilter 59 in filter module 71 can be mounted directly onto surface 11 or tape 10, without lamination surface 84 in between. A portion of filter 2 or prefilter 59 can be exposed, without lamination surface 85 above it so it can be crimped, or notched. A portion of filter 2 or prefilter 59 can be exposed, without lamination surface 85 above it so that a barrier 13 can be integrated. A portion of filter 2 or prefilter 59 can be exposed, without lamination surface 85 above it so that it can be placed under AOW 4.

Filter module 71 can be manufactured or laminated in a long filter module strip. The filter module strip can comprise a filter material strip, a prefilter material strip, a first lamination surface strip and a second lamination surface strip. The filter module strip can be singulated by scissors, guillotine or slitter into individual filter modules 71. The length of the filter module 71 can be determined by the width of the filter module strip width. The length of the filter module 71 can be less than 10 mm, 9 mm, 8 mm, 7 mm, 6 mm, 5 mm, 4 mm, 3 mm, 2 mm or 1 mm. The edges of the lamination surfaces 84 and 85 can be aligned to the edge of the filter 2 and/or the edge of prefilter 59. The singulation of the filter module strip can align the edges of the lamination surfaces 84 and 85 and the edge of the filter 2 and/or the edge of prefilter 59. The edges of filter 2 and prefilter 59 can be aligned. The singulation of the filter module strip can determine the width of the filter module 71. The width of the filter module 71 can be less than 10 mm, 9 mm, 8 mm, 7 mm, 6 mm, 5 mm, 4 mm, 3 mm, 2 mm or 1 mm. The filter module strip can be manufactured by standard lamination processes. The filter module strip can be manufacturing by layering or overlapping a filter material strip, a prefilter material strip and a first and second lamination surface material strip. The filter module strip can be manufactures in a web-to-web process wherein the filter material strip, prefilter material strip, first lamination surface material strip and second lamination surface material strip are overlapped and laminated in a continuous web-to-web process. A roller or press can crush the prefilter material strip into the filter material strip, either before or after either one or both first and second surface lamination material strips are laminated. A roller or press can adhere one or a plurality of lamination material strips to the prefilter material strip and/or the filter material strip. Filter module 71 can accept less than 10 µL, 9 µL, 8 µL, 7 µL, 6 µL, 5 µL, 4 µL, 3 µL, 2 µL or 1 µL before filter 2 or prefilter 59 or filter module 71 becomes saturated. A crimp or notch to create barrier 13 can be added into filter 2 of filter module 71 before the filter module strip is singulated. The crimp or notch acting as barrier 13 can be made by a press or a drum or a roller. The depth of the crimp or notch or barrier 13 can be controlled by a precise mechanical spacer.

Filter module 71 can comprise a filter 2 with first and second lamination surfaces 84 and 85, without a prefilter 59. Filter module 71 can comprise a plurality filters and prefilters. Filter 2 or prefilter 59 can be whole blood filters. Prefilter 59 can be a sintered plastic material. Prefilter 59 can distribute sample 18 or whole blood 16 evenly across filter 2. Filter 2 or prefilter 59 can be impregnated with an amino acid, such as alanine, glycine or aspartate to promote the separation of plasma 17 from whole blood 16. Filter module 71 can contact AOW 4. Filter module 71 can be separated from AOW 4 by a gap 12. Filter module 71 can be above surface 11 or tape 10. Filter module 71 can be mounted on surface 11 using tape 10.

Filter module 71 or filter 2 can have a plurality of barriers 13. Filter module 71 or filter 2 can have a first barrier 13 around part or all of its perimeter. The first barrier 13 can prevent whole blood cells from leaking out the side of filter module 71 or filter 2 onto surface 11 or tape 10 or into surface capillary 22. The first barrier 13 can be a crimp or a notch or a hydrophilic coating. The crimp generating the first barrier 13 can be applied after the filter module 71 or filter 2 are applied on surface 11 or tape 10. Filter module 71 or filter 2 can have a second barrier 13 on a portion of filter module 71 or filter 2. The second barrier 13 can be a crimp or a notch or a hydrophobic coating. The second barrier 13 can contact AOW 4.

Filter module 71 can be separated from AOW 4 by a gap 12. Filter module 71 or filter 2 can be in contact with AOW 4. Filter module 71 or filter 2 can be under AOW 4. Filter module 71 or filter 2 can be between surface 11 or tape 10 and AOW 4. The second barrier 13 can be between surface 11 or tape 10 and AOW 4. AOW 4 can crush or overlap filter module 71 or filter 2 in a crush region. Channel 25 can have an enlargement 86 around the crush region wherein AOW 4 crushes or overlaps filter 2 or filter module 71. The enlargement 86 can allow plasma 17 or filtrate 24 to circumvent the region. Channel 25 can be wider than the crush region. The crush region can promote the wicking of plasma 17 or filtrate 25 into surface capillary 22. A corner of AOW 4 can crush filter 2 or filter module 71 to minimize the crush region. The crush region can be smaller than 9 mm$^2$, 4 mm$^2$, 1 mm$^2$ or 0.25 mm$^2$. Channel 25 can traverse the region wherein AOW 4 crushes filter 2 or filter module 71. Channel 25 can be below the crush region. AOW 4 can have one or a plurality of extensions 87 that protrude from the portion of AOW 4 that forms the wells. A portion or all of extension 87 can crush or overlap filter 2 or filter module 71 and form the crush region. The extensions 87 can be less than 5 mm, 4 mm, 3 mm, 2 mm, 1 mm, 0.5 mm wide and less than 5 mm, 4 mm, 3 mm, 2 mm, 1 mm, 0.5 mm long. The extensions 87 can facilitate the positioning of the filter 2 or filter module 71 with respect to AOW 4. AOW 4 can have a plurality of extension with different lengths and widths. Device 1 can have a plurality of filters 2 or filter modules 71 of different size. Device 1 can have a plurality of filters 2 or filter modules 71 of length and width. The shape of filter 2 and filter module 71 can be rectangular or square or a parallelogram.

Assay Control

Device 1 can have a sample electrode 90. Sample electrode 90 can detect the presence of a sample 18, whole blood 16, plasma 17 or filtrate 24 on surface 11, or PCB 3 or IC 9. Sample electrode 90 can be capacitive, wherein sample electrode 90 can detect a change in dielectric constant of the medium in contact with sample electrode 90. Sample electrode 90 can be resistive, wherein sample electrode 90 can detect a change in the resistance of the medium in contact with sample electrode 90. Sample electrode 90 can be acoustic wherein sample electrode 90 can detect a change in the acoustic properties of the medium in contact with sample electrode 90. The medium in contact with sample electrode 90 can be air, sample 18, plasma 17, whole blood 16, filtrate 24 or any other material that constitute device 1. Sample electrode 90 can be first exposed to air. Sample electrode 90 be subsequently exposed to sample 18, plasma 17, whole blood 16, filtrate 24. Sample electrode 90 can detect contact with sample 18, plasma 17, whole blood 16, filtrate 24. Sample electrode 90 can detect the transition from one medium to another. Sample electrode 90 can be made of gold, platinum or any other material that can detect contact of sample 18, plasma 17, whole blood 16, filtrate 24. Sample electrode 90 can be made of a material that doesn't corrode. Sample electrode 90 can be on surface 11. Sample electrode 90 can be an exposed pad or lead of PCB 3 or IC 9. PCB 3 or IC 9 can have gold electroplated pads or leads. Sample electrode 90 can be gold electroplated pads or leads. Sample electrode 90 can be positioned under, above, laterally, in contact or in proximity to sample inlet 66, sampling capillary 65, filter module 71, filter 2, channel 25, AOW 4, tape 10, gap 12, capillary channel 22 or IC 9.

Sample electrode 90 can be formed by two pads in proximity. The distance between two pads can be less than 1 mm, 100 µm, 30 µm, 10 µm, 5 µm or 1 µm. Sample electrode 90 can comprise interdigitated pads. One pad of sample electrode 90 can be electrically connected to a resistor. The resistor in contact with one pad of sample electrode 90 can be larger than 1 kΩ, 1 MΩ, 10 MΩ. One pad of sample electrode 90 can be connected to ground or a power supply. The voltage across or current through sample electrode 90 can change when sample 18, whole blood 16, plasma 17 or filtrate 24 is applied. IC 9 or electronics on PCB 3 can detect a change of voltage across or current through sample electrode 90. A change of voltage across or current through sample electrode 90 can turn on or activate device 1, IC 9, the power management or the power control system in device 1.

Sample electrode 90 can detect the application of sample 18, whole blood 16, plasma 17 or filtrate 24 on device 1. Device 1 can detect the sample application time corresponding to the application of sample 18, whole blood 16, plasma 17 or filtrate 24 on inlet 66 using sample electrode 90. IC 9 or device 1 can record or store the sample application time when the sample 18 was applied. The sample application time can be part of the assay information. Device 1 can have a plurality of sample electrodes 90. The information from one or a plurality of sample electrodes can be combined to measure device 1 timing information. The timing information from one or a plurality of sample electrodes 90 can be subtracted by IC 9 or device 1. Timing information can be assay information. Two sample electrodes can be placed on opposite sides of filter 2 or filter module 71 to measure or estimate the sample dwell time. The sample dwell time can be assay information. Sample dwell time can be the time sample 18, whole blood 16, plasma 17 or filtrate 24 dwells in filter 2 or filter module 71.

Device 1 or system 100 can detect the sample arrival time corresponding with the arrival of plasma 17 or filtrate 24 in well 19. Device 1 or system 100 can detect the sample arrival time by detecting the increase in absorbance due to the arrival of plasma 17 or filtrate 24 in well 19. The sample arrival time can be assay information. The sample application time can be subtracted from the sample arrival time to measure, estimate or approximate the sample dwell time. The concentration of dissolved reagents 33 in plasma 17 or filtrate 24 can have a dwell time correlated to the sample dwell time. Dwell time correlation can be assay information. IC 9 or device 1 can combine the sample dwell time and dwell time correlation arithmetically to correct the assay measurements for departures from a nominal sample dwell time.

Device 1, IC 9 or reader 100 can serially measure the absorbance of the filtrate 24 or plasma 17 in well 19 at high frequency. The high frequency at which device 1, IC 9 or reader can serially measure the absorbance of the filtrate 24 or plasma 17 in well 19 can be higher than 1 Hz, 10 Hz, 50 Hz, 100 Hz, or 1 kHz. Serial measurements of the absorbance of the filtrate 24 or plasma 17 in well 19 can be taken at high frequency and can be combined to determine a sample slope. The sample slope can be positive while plasma 17 or filtrate 24 enters well 19, corresponding to an increase in the absorbance of the filtrate 24 or plasma 17 in well 19. The sample slope can become abruptly or highly negative when the filtrate 24 or plasma 17 contacts the protrusion 50 or lens 51, corresponding to the elimination of the reflector 6 to air and air to plasma 17 or air to filtrate 24 interfaces. Device 1 or reader 100 can generate a sample slope signal when sample slope breaches a threshold or changes polarity. A sample slope signal can indicate that well 19 is full, that the path length 39 is stable and that the measurement of analyte 36 can proceed. Analyte 36 in filtrate or plasma 17 can be measured in well 19 when a sample slope signal is produced. Device 1 or reader can produce a plurality of sample slope signals. Device 1 or reader 100 can produce one sample slope signal for each well. The results of device 1 can be invalidated if one sample slope signal is not produced. Device 1 or reader 100 can prompt a use to provide more sample 18 or whole blood 16 until one or all the sample slope signals are produced. A sample slope can also be employed to measure rate reaction constants and by extension the activity of enzymes. Device 1 or IC 9 can contain a data buffer with past absorbance measurements of plasma 17 or filtrate 24 in well 19. Device 1 or IC 9 can perform regression analyses on the past absorbance measurements in the data buffer. Examples of regression analyses include least square fits, linear regressions, power law regressions, exponential regressions or other numerical regressions.

LED 5 or LED 109 can emit light 21 with varying power. Device 1 or reader 100 can have a power reference photodetector. Light 21 can travel from LED 5 or LED 109, can travel through reflector 6 or reflector 114 and light 21 can be incident on the reference power photodetector, without traversing through plasma 17 or filtrate 24. The power reference photodetector can produce a power reference measurement. To mitigate the effects of the varying power of light 21, the power reference measurement can be arithmetically combined with the measurement from photodetector 8 or photodetector 113. The power reference measurement can be subtracted from the measurement of photodetector 8 or photodetector 113. The measurement of photodetector 8 or photodetector 113 can be divided by the power reference measurement.

Device 1 can have one or a plurality of power reference photodetectors for each LED 5. Reader 100 can have one or a plurality of power reference photodetectors for each LED 109.

Device 1 can have a plurality of temperature sensors. A temperature sensor can be integrated in IC 9. A temperature sensor can be mounted on PCB 3. Device 1 can have a plurality of heaters.

A heater can be integrated in IC 9. A heater can be mounted on PCB 3. A heater can be a resistor with resistance value less than 200Ω, or 100Ω, or 50Ω, or 20Ω, or 10Ω. The one or plurality of heaters on device 1 can be controlled in a closed loop using the feedback from temperature measurements from the one or plurality of temperature sensors on device 1. The one or plurality of heaters on device 1 can be controlled in an open loop using the temperature measurements from the one or plurality of temperature sensors on device 1 and heating information stored on device 1. The heating information can include look-up tables or predictive models providing the total thermal energy required to reach a desired reaction temperature. Temperature information from the temperature sensors can be used to compensate for any difference between the reaction temperature of reactions 35 and the desired reaction temperature. The one or plurality of heaters on device 1 can be configured in an open loop using the temperature measurements from the one or plurality of temperature sensors on device 1 and heating information stored on device 1 to take reaction temperature of reaction 35 to or near to the desired reaction temperature. The one or plurality of heaters on device 1 can be configured in a closed loop using feedback from the temperature measurements from the one or plurality of temperature sensors on device 1 to keep the reaction temperature of reaction 35 at or near the desired reaction temperature.

In some reactions 35, a precise amount of a critical reagent must be dispensed. The variable dwell time through filter 2 or filter module 71 can preclude placing critical reagent in the filter 2 or filter module 71. Critical reagent can be dispensed and dried on the surface of the photodetector 8 or surface 11 or inside well 19. Critical reagent can be placed and dried on the surface of the protrusion 50 that can contact the filtrate 24 or plasma 17 in well 19. Critical reagent can be placed and dried on the surface of the lens 51 that contact the filtrate 24 or plasma 17 in well 19. Critical reagent can include magnetic particles. Critical reagent can be placed using contact dispense or print dispense. The amount of critical reagent dispensed can accurate to within 10%, 7%, 5%, 4%, 3%, 2%, 1% or 0.5%.

System Integration

Device 1 can comprise a housing 44. Housing 44 can comprise a top housing 91 and a bottom housing 92 that snap or press fit together. Top housing 91 can have one or a plurality of posts 93 that can slot into one or a plurality of holes 94 in the bottom housing 92. Posts 93 can extend through PCB 3 via through-holes 96 in PCB 3. Posts 93 can register top housing 91 to PCB 3 in one, two or three dimensions. Post 93 can have a foot 95 to register top housing 91 to PCB 3 in the z-axis. Posts 93 can be concentric to and similar in diameter with through-holes in PCB 3 to register top housing 91 to PCB 3 in the x-y plane. Posts 93 can friction fit into holes in bottom housing 92.

Top housing 91 can have an inlet 66. Inlet 66 can accept whole blood 16, plasma 17 or sample 18. The top Inlet 66 can be an opening in top housing 91. The bottom of inlet 66 or sample tool 65 can be in proximity to or contact filter 2 or filter module 71. Whole blood 16, plasma 17 or sample 18 in inlet 66 or sample tool 65 can contact one or a plurality of filters 2 or filter modules 71. Whole blood 16, plasma 17 or sample 18 in inlet 66 or sample tool 65 can flow to one or a plurality of filters 2 or filter modules 71. Inlet 66 or sample tool 65 can be fluidically connected to one or a plurality of filter 2 or filter module 71. Inlet 66 or sample tool 65 can be in proximity to or contact surface 11, PCB 3 or tape 10. The bottom of Inlet 66 or sample tool 65 can crush one or a plurality of filter 2 or filter module 71. Inlet 66 or sample tool 65 can apply pressure on one or a plurality of filter 2 or filter module 71. The amount inlet 66 crushes filter 2 or filter module 71 can be determined by the insertion of post 93 in hole 94. The force applied by inlet 66 on filter 2 or filter module 71 can be determined by the insertion of post 93 in hole 94. Inlet 66 or sample tool 65 can crush one or a plurality of prefilter 59 or filter module 71 to ensure the flow of whole blood 16, plasma 17 or sample 18 in inlet 66 or sample tool 65 to one or a plurality of filter 2 or filter module 71. Inlet 66 or sample tool 65 can contact prefilter 59 of filter module 71 and crush filter 2 of filter module 71. Filter 2 of filter module 71 can be softer than prefilter 59 of filter module 71. Inlet 66 or sample tool 65 can contact and crush prefilter 59 of filter module 71. Filter 2 of filter module 71 can be harder than prefilter 59 of filter module 71. Inlet 66 can be separate from top housing 91. Inlet 66 or sample tool 65 can be a capillary to collect whole blood 16, plasma 17 or sample 18. Inlet 66 or sample tool 65 can be inserted into an opening in top housing 91. Inlet 66 or sample tool 65 can be manufactured from a hydrophilic polymer such as cellulose acetate or PMMA. Inlet 66 or sampling tool 65 can be hydrophilically coated. The inner diameter of inlet 66 or sample tool 65 can be more than 0.5 mm, 1 mm, 2 mm, 3 mm, 4 mm, or 5 mm. Inlet 66 can accept a sampling tool 65. Sampling tool 65 can be inserted into inlet 66. Sampling tool 65 can be a pipette, a pipette tip or a capillary. When inserted into inlet 66, sampling tool 65 can be fluidically connected to one or a plurality of filter 2 or filter module 71. Sampling tool 65 can have a hash mark indicating the minimum sample required. Sample tool 65 can be a transparent capillary. Sample tool 65 can have a flow stop feature to avoid overfill.

Sensor Integration

Multiple types of sensors can be integrated into PCB 3. The multiple types of sensors can include general chemistry sensors, immuno-assay sensors, nucleic acid sensors, electrochemical sensors, coagulation sensors, or general sample indication sensors. The top exposed surface of an electrochemical IC or the top exposed surface of a magnetic sensing IC 83 can be planar with surface 11 or PCB 3. One or a plurality of IC 9, one or a plurality of electrochemical IC, one or a plurality of magnetic sensing IC 83 can be inserted in a single opening in PCB 3 and planarized with epoxy. One or a plurality of IC 9, one or a plurality of electrochemical IC, one or a plurality of magnetic sensing IC 83 can be inserted in a plurality opening in PCB 3 and planarized with epoxy. Each IC can be inserted into a dedicated opening in PCB 3. All the exposed ICs planar with PCB 3 can be wirebonded to PCB 3. All the ICs can be planar with PCB 3 to within 100 µm, 50 µm, 25 µm, 10 µm, 5 µm, 3 µm, 2 µm or 1 µm.

Device 1 can also integrate strip based electrochemical sensors. A strip based electrochemical sensor can detect glucose, creatinine, lactate or other indications. A strip based electrochemical sensor can be attached to PCB 3 with adhesive. Wirebonds can electrically connect a the electrical leads on a strip based electrochemical sensor to pads on a PCB 3. Device 1 can contain the electronics to interface with a strip based electrochemical sensor. Device 1 can contain an ammeter, voltmeter and power management system to measure an analyte using a strip based electrochemical sensor mounted on PCB 3. Device 1 can store the calibration information for a lot of strip based electrochemical sensor. Inlet 66 can fluidically connect to the inlet on one or more strip based electrochemical sensor. The strip based electrochemical sensor can detect an analyte in whole blood.

Device 1 can be circular to integrate multiple types of sensors to multiple types of analytes. One or a plurality of sensors can collect whole blood from the same inlet 66. A plurality of sensors can be arranged in a circle around a common inlet 66.

A plurality printed circuit boards connected to different sensors can be mounted or connected to surface 11 or PCB 3. A common inlet 66 can fluidically connect to a plurality of printed circuit boards through capillary action. A central capillary in inlet 66 can split and turn 90° into a plurality of capillaries that deliver sample to a plurality of sensors integrated on one or a plurality of PCBs.

Figure 1B:
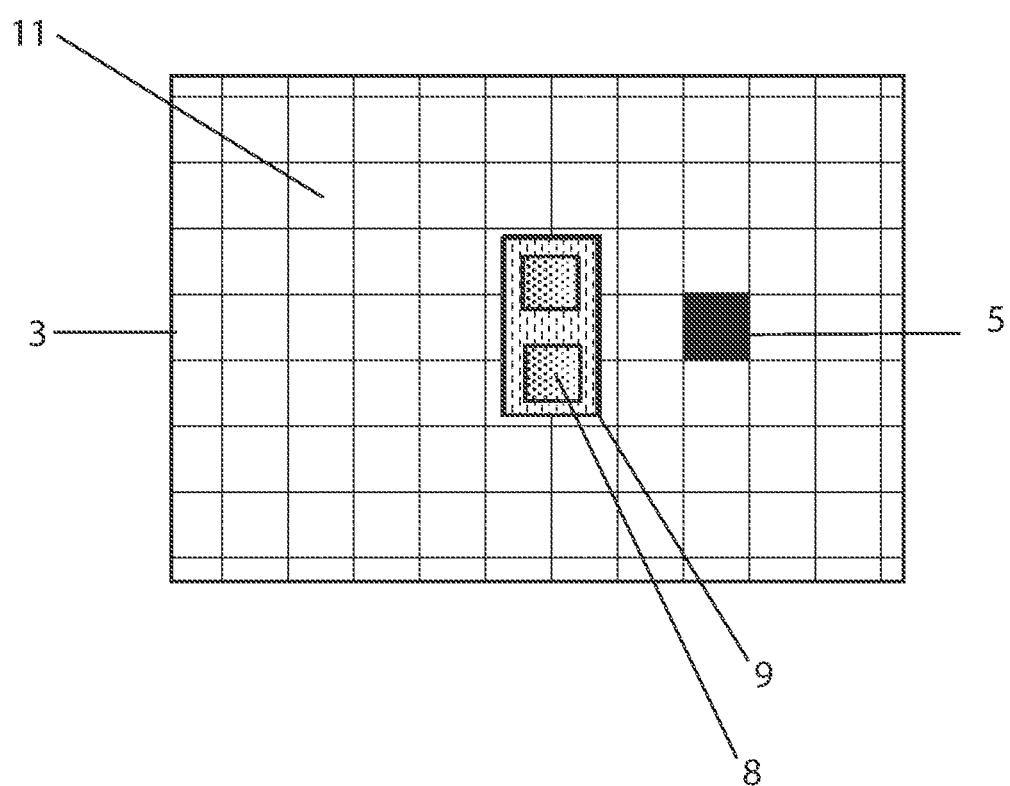
FIG. 1B is a cross-sectional top view of IC and an LED mounted on a PCB.
Figure 1C:
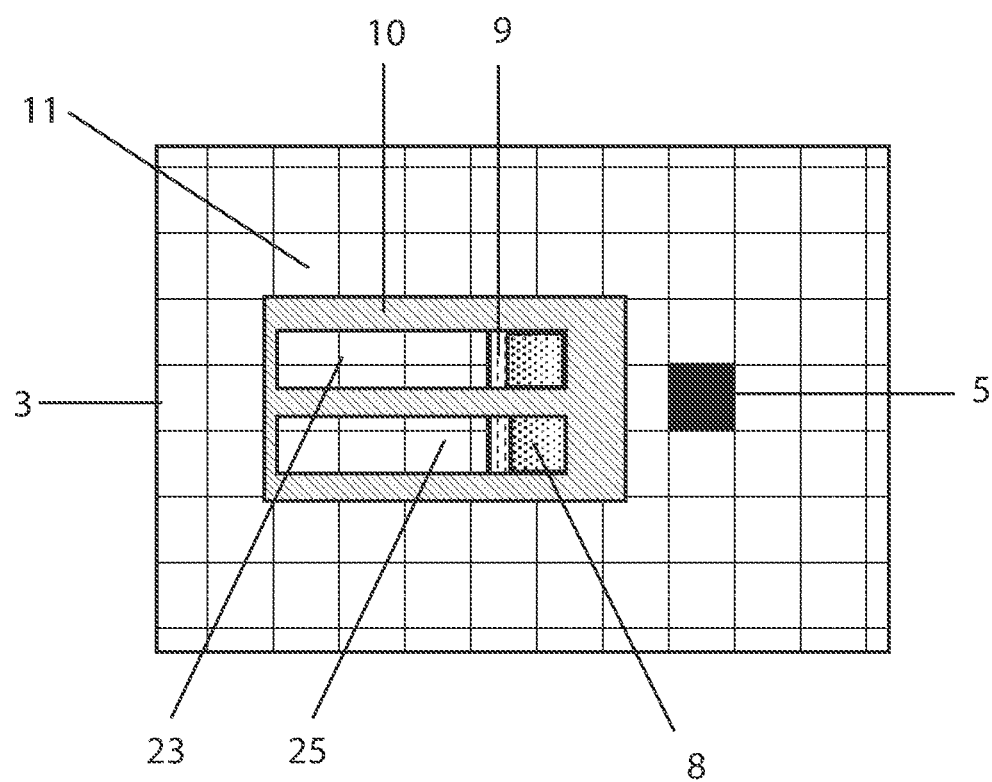
FIG. 1C presents a cross-sectional top view of tape with channels mounted on PCB.
Figure 1D:
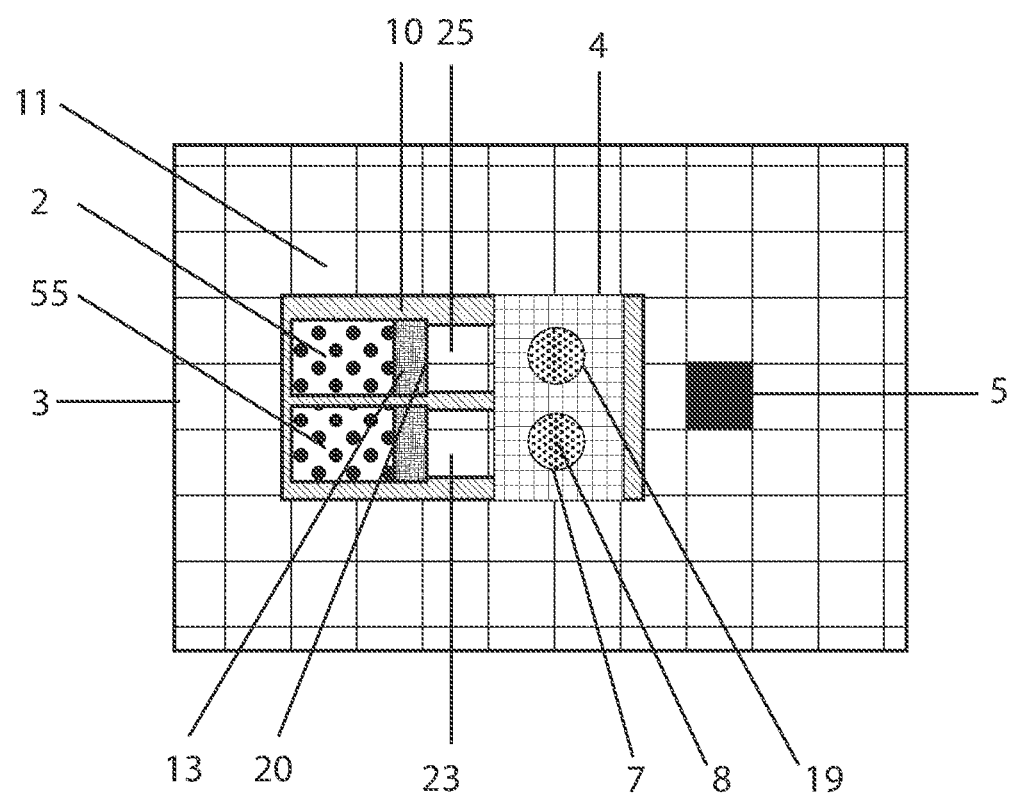
FIG. 1D shows a cross-sectional top view of filter, filter and AOW mounted on tape.
Figure 1E:
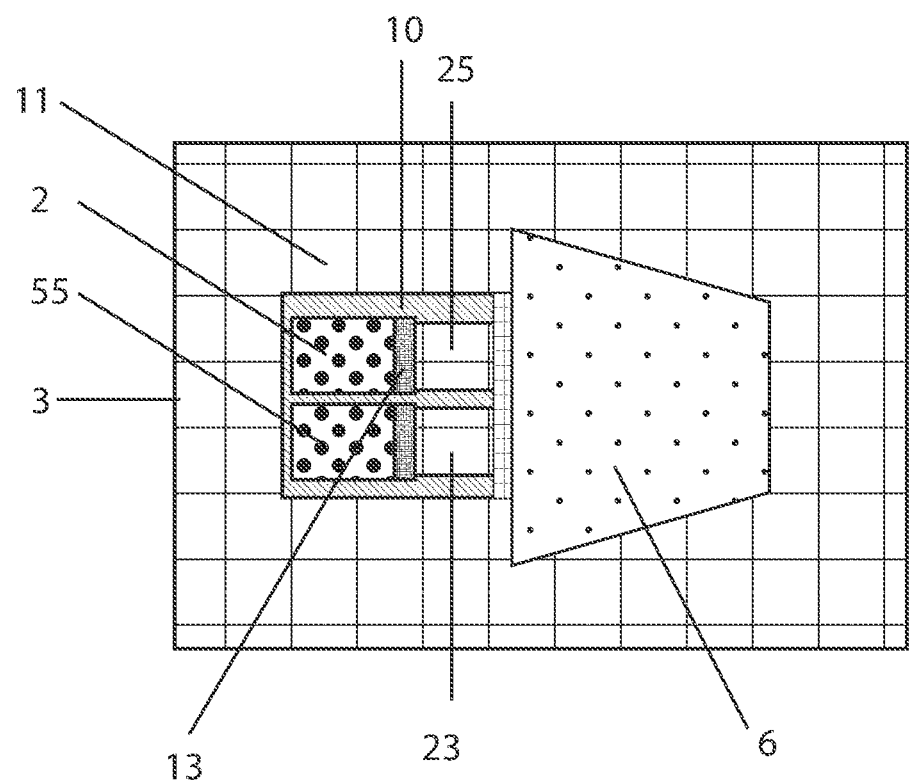
FIG. 1E is the top view of the device with a reflector.

FIG. 1A presents a cross-sectional side view of device 1 that can comprise a filter 2, a surface 11 and a spectrophotometer 15. Filter 2 can be mounted on top of surface 11 using tape 10. Surface 11 can be the surface of PCB 3. Barrier 13 can be a notch in filter 2. Plasma 17 can flow directly from surface 11 into well 19. AOW 4 can be mounted on top of surface 11 using tape 10. Surface 11 can be hydrophilic. Surface 11 can be capable of fluidically connecting filter 2 to well 19, wherein plasma 17 can flow on surface 11 across gap 12 and into capillary 22. IC 9 can integrate photodetector 8. IC 9 can be incorporated into surface 11. Protrusion 50 and lens 51 can contact plasma in well 19. Reflector 6 can contain an input lens 58 to collect light 21 from LED 5. Reflector 6 can contain optical elements 28 and 29 to redirect light 21 from LED 5 through well 19 and onto photodetector 8. Display 41 and a battery 40 can be electrically connected to PCB 3. PCB 3 can have a top and bottom side. Display 41 can be mounted on the top side or bottom side of PCB 3. Battery 40 can be mounted on the top side or bottom side of PCB 3. FIG. 1B is a cross-sectional top view of IC 9 and LED 5 mounted on PCB 3. LED 5 can be mounted on surface 11. LED 5 can be mounted on the top side of PCB 3. IC 9 can contain 2 photodetectors, whose surfaces can be incorporated with surface 11. FIG. 1C presents a cross-sectional top view of tape 10 with channels 23 and 25 mounted on PCB 3. Tape 10 can be double sided tape and can be used to generate channels 23 and 25. Channels 23 and 25 can be fluidically isolated from one another. FIG. 1D shows a cross-sectional top view of filter 2, filter 55 and AOW 4 mounted on tape 10. Whole blood 16 can be applied to both filter 2 and 55. Channels 23 and 25 can be capable of channeling plasma from filters 55 and 2, respectively, to wells 7 and 19, respectively. AOW 4 can contain 2 wells, 7 and 19. FIG. 1E is the top view of device 1 with reflector 6. The battery 40 and display 41 are omitted from FIG. 1B through 1E for simplicity. In the implementation presented in FIG. 2, plasma 17 can flow up well 19 towards protrusion 50 and lens 51. Moreover, light 21 can travel down through well 19 and through plasma 17, through surface 11 and onto photodetector 8.

Figure 2:
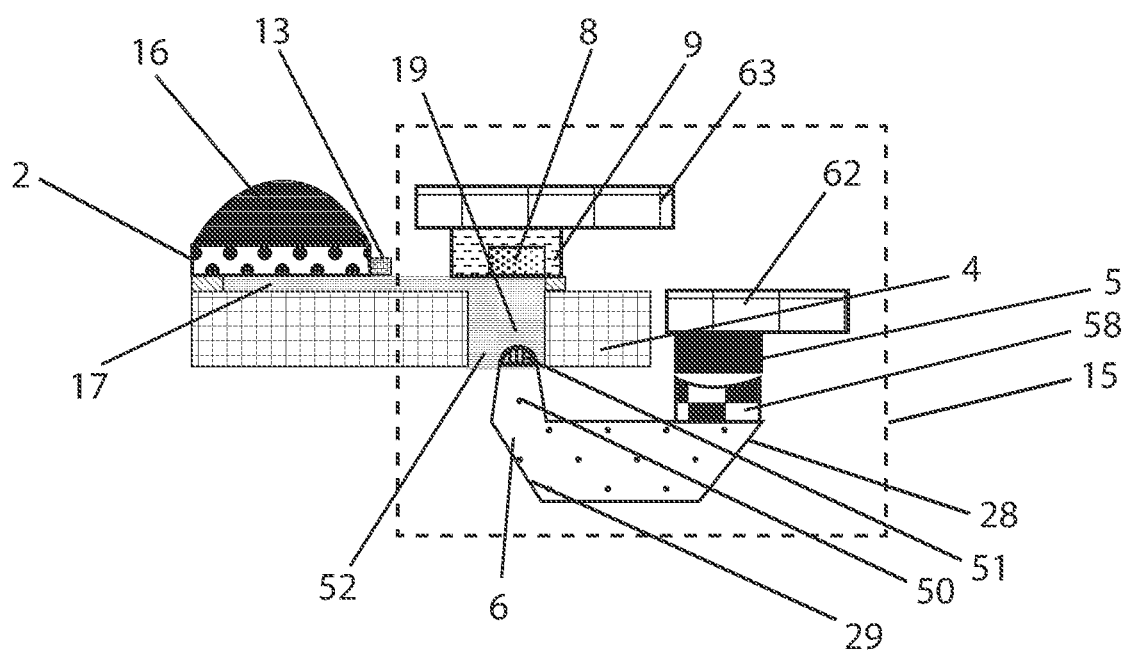
FIG. 2 presents a cross-sectional side view of the device with IC 9 and filter 2 mounted above AOW 4.

FIG. 2 presents a cross-sectional side view of device 1 with IC 9 and filter 2 mounted above AOW 4. Filter 2 can be mounted above AOW 4 using tape 10. The top surface of AOW 4 can be surface 11. Barrier 13 can be a notch in filter 2. Plasma 17 can flow directly from the top surface of AOW 4 into well 19. IC 9 can be mounted above AOW 4 using tape 10. The top surface of AOW 4 can be hydrophilic. The top surface of AOW 4 can be capable of fluidically connecting filter 2 to well 19, wherein plasma 17 can flow on the top surface of AOW 4 across gap 12 and into well 19. Gap 12 can be generated by the gap between filter 2 and IC 9. IC 9 can integrate photodetector 8. Protrusion 50 and lens 51 can contact plasma in well 19. Reflector 6 can contain an input lens 58 to collect light 21 from LED 5. Reflector 6 can contain optical elements 28 and 29 to redirect light 21 from LED 5 through well 19 and onto photodetector 8. PCB 3, display 41 and battery 40 were omitted from FIG. 2 for simplicity. LED 5 can be mounted into a flexible PCB 62. IC 9 can be mounted into a flexible PCB 63. A flexible PCB can be manufactured out of a flexible material such as Kapton. A flexible PCB can be connected to a standard PCB by a hot bar reflow process, taping, adhering or wirebonding. Flexible PCBs 62 and 63 can be hot bar reflowed onto PCB 3 which can contain display 41 and battery 40. The use of flexible PCBs can allow easy alignment of the IC 9 to well 19 and of LED 5 to input lens 58, respectively. LED 5 can be mounted onto reflector 6 for superior alignment of LED 5 and reflector 6. Superior alignment of IC 9 to well 19 and of LED 5 to input lens 58, respectively, can lead to lower path length errors. In the implementation presented in FIG. 2, plasma 17 can flow down well 19 towards protrusion 50 and lens 51. Moreover, light 21 can travel up through well 19 and through plasma 17, through the surface of photodetector 8. A vent 52 can be used to allow air in well 19 to escape as the plasma 17 enters.

Figure 3:
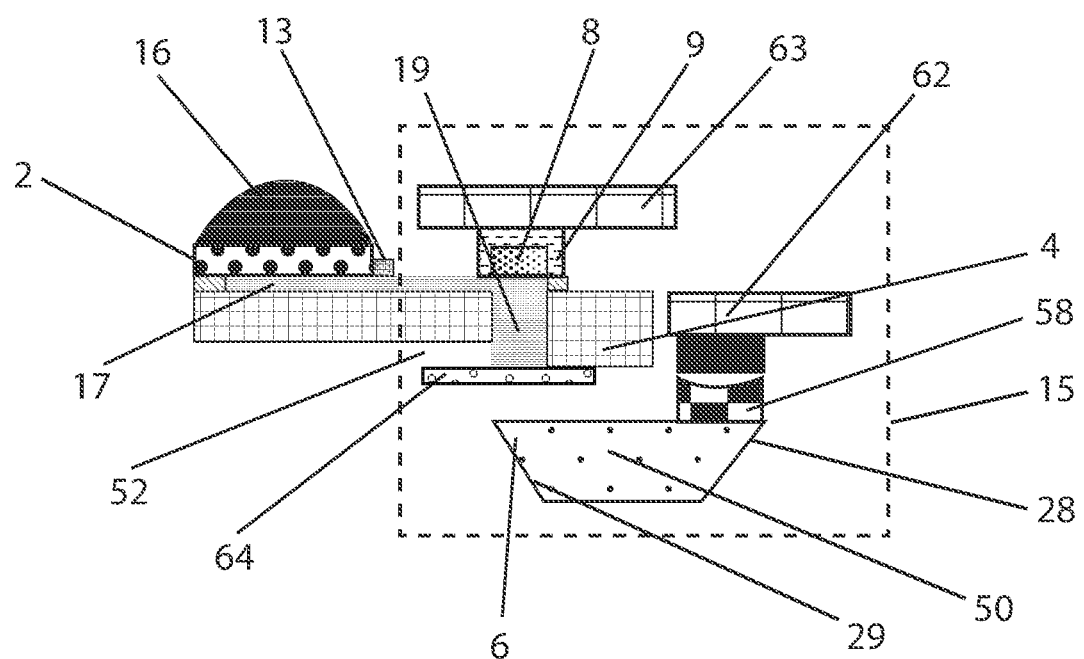
FIG. 3 is a cross-sectional side view of the device wherein a cover is used to retain plasma in the well.

FIG. 3 is a cross-sectional side view of device 1 wherein a transparent cover 64 can be used to eliminate the meniscus effects in well 19. Plasma 17 can flow through well and create an ideal transmission interface with cover 64. Cover 64 can be transparent to the optical frequency of detector. Cover 64 can be over molded, adhered using double sided tape, glued or heat staked on AOW 4.

Figure 4A:
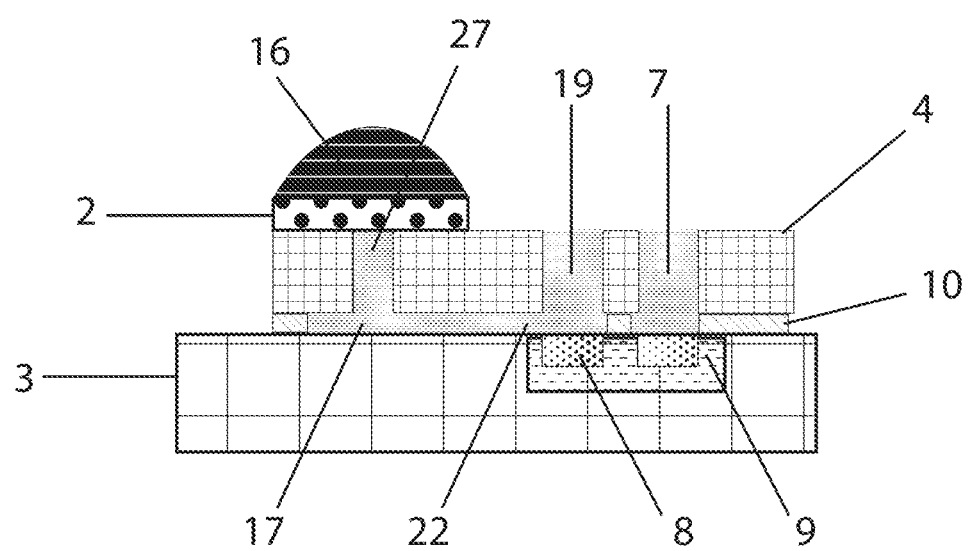
FIG. 4A shows a cross-sectional side view of an implementation of the device where a filter is mounted on AOW and AOW is mounted on PCB.

FIG. 4A show an implementation of device wherein filter 2 can be mounted on AOW 4 and AOW 4 can be mounted on PCB 3. Filter capillary 27 can draw plasma directly from the bottom of filter 2 and can be fluidically connected with surface capillary 22, such that plasma 17 from filter 2 can flow through filter capillary 27 and into surface capillary 22.

Figure 4B:
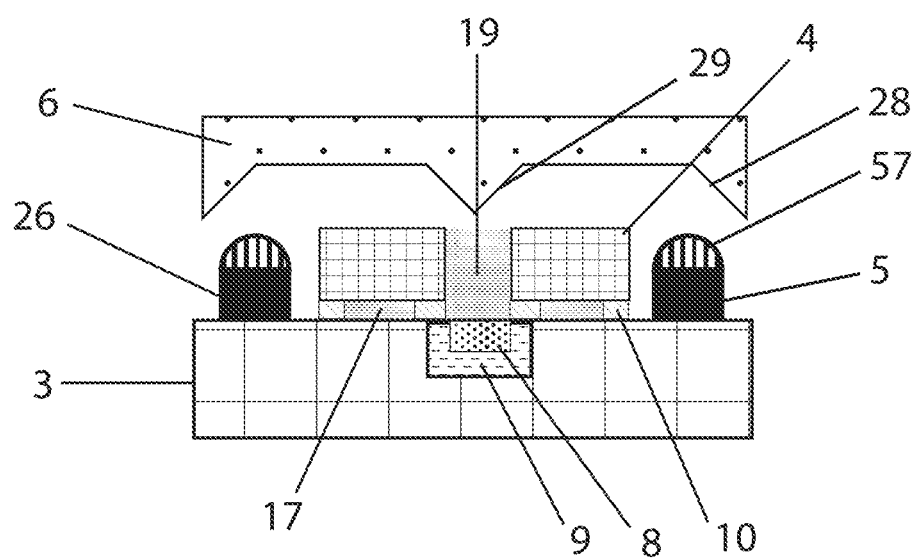
FIG. 4B presents a cross-sectional side view of an implementation of the device with two LEDs, and where a first and second LED are emitting light into the same well.

FIG. 4B presents a cross-sectional side view of an implementation of device 1 with two LEDs, LED 5 and LED 26 emitting light into the same well 19. LED 5 can emit light with a first optical spectrum and a second LED 26 can emit light with a second optical spectrum, different from the first optical spectrum. The first LED 5 and the second LED 26 can be activated intermittently or concurrently. A reflector 6 can direct the light from LED 5 and LED 26 into well 19. Photodetector 8, exposed at the bottom of well 19, can detect the first optical intensity of the first optical spectrum from the first LED 5 minus the spectral absorption of the plasma 17 with reagents in well 19. Photodetector 8, exposed at the bottom of well 19, can detect the second optical intensity of the second optical spectrum from the second LED 26 minus the spectral absorption of the plasma 17 and reagents in well 19. The first optical intensity measured at different time points can be used to quantify the rate of or the amount of reagent reacted in reaction 35. The difference between the first optical intensity and the second optical intensity measured at difference time points can be used to quantify the rate of or the amount of reagents reacted in reaction 35.

The first LED 5 can produce a narrow band spectrum centered around a first frequency and the second LED 26 can produce a narrow band spectrum centered around a second frequency, different from the first frequency. Reaction 35 can alter the absorptivity of plasma 17 at the first frequency. By measuring light emitted from the first LED 5, and accounting for the time elapsed, a rate or endpoint measurement of reaction 35 can be calculated. By subtracting the measurements from light emitted from the first LED 5 and second LED 26, and accounting for the time elapsed, a rate or endpoint measurement of reaction 35 can be calculated. First LED 5 and second LED 26 can illuminate different wells.

FIG. 4B also provides an implementation of reflector 6 using external reflection or mirrors. Optical elements 28 and 29 are mirror and redirect light 21 from LED 5 into plasma 17 of well 19.

Figure 5:
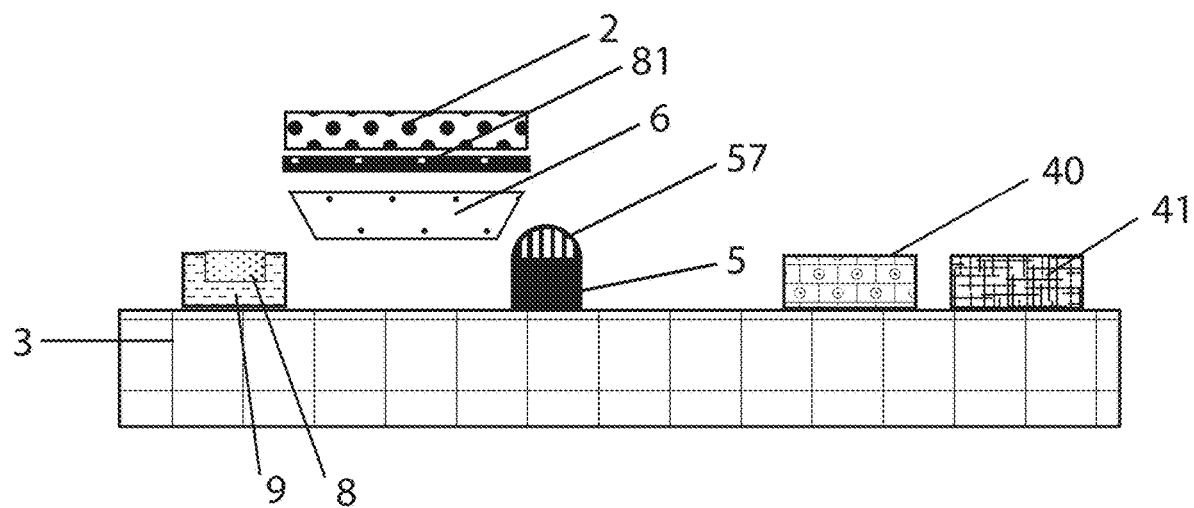
FIG. 5 shows the cross-sectional side view of a reflectance spectrophotometer implementation of the device.

FIG. 5 show the cross-sectional side view of a reflectance spectrophotometer implementation of device 1. Filter 2 can be placed in proximity or in contact to a reflectance surface 81. LED 5, IC 9 and photodetector 8 can be mounted in PCB 3. PCB 3, LED 5, reflector 6 and IC 9 can be placed on opposite sides of the reflectance surface 81 with respect to filter 2. Plasma 17 from whole blood 16 can mix with filter reagents 32 in filter 2. Chemical reaction 35 can proceed in plasma 17 with dissolved reagents 33. Plasma 17 can contact reflectance surface 81. Reflector 6 can direct light from LED 5 onto plasma 17 on reflectance surface 81. Light 21 can reflect off plasma 17 and change in spectral composition by doing so according to the concentration of reporter molecule 56 in plasma 17. Light 21 reflected off of plasma 17 can reflect onto photodetector 8 of IC 9. Light 21 reflected off of plasma 17 can reflect onto reflector 6. Reflector 6 can redirect light 21 reflected off of plasma 17 onto photodetector 6. Photodetector 8 can measure the changes in the light 21 reflected off of plasma 17 over time at optical detection frequency 60 to determine the concentration of the reporter molecule 56 in plasma 17. Reflector 6 can redirect light from LED 5 to multiple reflectance surfaces. Reflector 6 can redirect light 21 reflected off of plasma 17 from a plurality of reflectance surfaces to a plurality of photodetectors. The light 21 reflected off of plasma 17 reflected from a plurality of reflectance surface can be detected and measured by a plurality of photodetectors. Filter 2 can be contained in a well 19. Well 19 can contain plasma 17. A plurality of wells can be mounted on a plurality of reflectance surfaces. A plurality of reflectance surfaces can be combined into a carrier surface.

Figure 6:
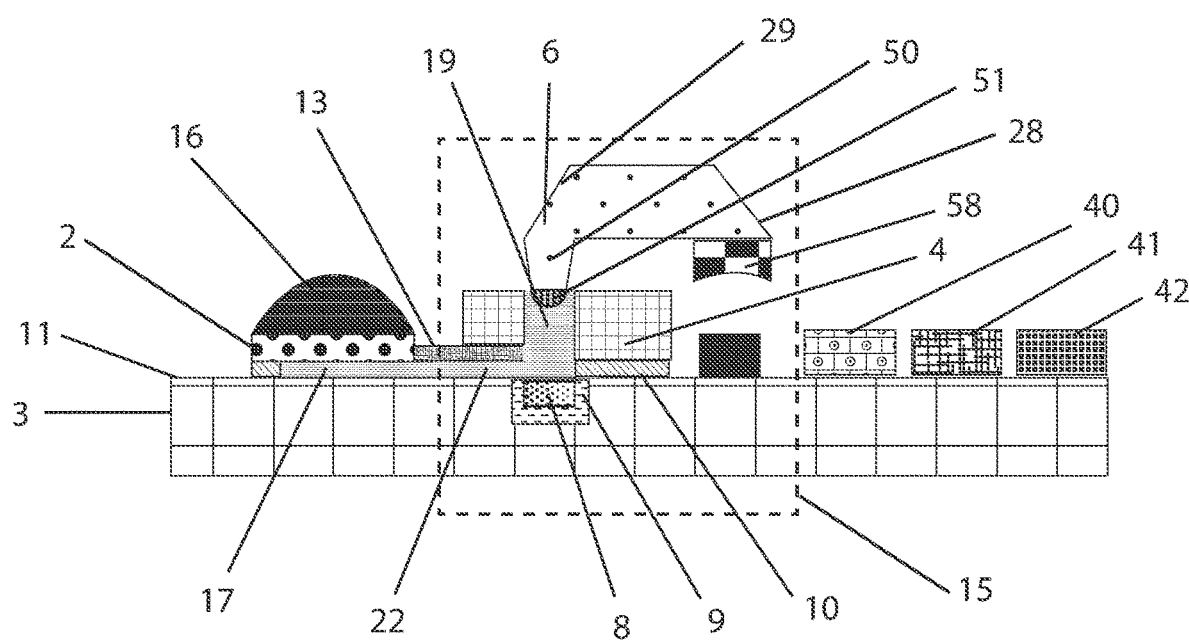
FIG. 6 is a cross-sectional side view of the device wherein filter is in capillary.

FIG. 6 is a cross-sectional side view of device 1 wherein filter 2 is in capillary 22. AOW 4 can contact, crush or depress filter 2 thereby generating the barrier 13. Capillary 22 can be partially of completely full with filter 2.

The device can include a reflector which may be implemented using external reflective surfaces, or using total internal reflective surfaces, or using total internal reflection and redirecting light from a single LED.

The device which can comprise a membrane separation filter, mounted on a surface. The surface can be the surface of a printed circuit board (PCB) or the surface of an IC. One or more array of wells (AOW) can be mounted on the surface. The AOW can be placed in proximity or adjacent to a filter. One or more light emitting diodes (LED) can be mounted on the PCB. A reflector can redirect light produced by an LED into a well. A photodetector can be placed below the well such that the photodetector can detect or measure light traversing through the well, from the top to the bottom of the well. The Photodetector can be integrated in an integrated circuits (IC). The IC can be embedded in, above or below the PCB. The IC can be mounted parallel to or flush with the surface and the PCB. The AOW can be mounted on the IC or the surface using double sided tape. The filter can be mounted on the surface using tape. The filter and AOW can be separated by a gap, wherein the surface under the gap is exposed or uncovered. The gap can also be filled with an impermeable material or a material that blocks red blood cells. The filter can have a notch along the edge adjacent to the gap to block red blood cells from flowing into the gap and into the well. A prefilter can be placed above or adjacent to the filter. The filter can contact the AOW.

The surface beneath the gap can be coated with a hydrophilic reagent, such as surface reagents. The filter can be coated or impregnated with filter reagents. The prefilter can be coated or impregnated with prefilter reagents. The well can be coated on the inside with well reagents. The bottom surface of the AOW can be coated with surface reagents or well reagents. Additional reagents can be dried in the form of a dried sphere. The dried sphere can be placed at the top of the well, at the bottom of well, below the filter, above the filter or in the gap. The dried sphere can be manufactured through lyophilization. The diameter of the dried sphere can be less than 2 mm, 1.5 mm, 1 mm, 0.75 mm, 0.5 mm, 0.4 mm, 0.3 mm, 0.2 mm, or 0.1 mm. The dried sphere can dissolve when contacted with fluid, such as the plasma.

The filter can be square, circular or any other shape. The AOW can contain between 1 and 100 wells. The tape can have between 1 and 100 slots that channel plasma from a filter to a well. Different slots can be fluidically isolated from one another on the surface of the PCB 3. Each slot can form separate reaction chambers, wherein different reactions can be performed. Separate slots can contact separate filters or they can contact a shared filter. Separate filters can contact separate prefilters, or they can contact a shared prefilter. 2 or more diodes can be placed on the same side or either side of the AOW.

A drop of whole blood from a fingerstick or venous whole blood draw can be applied on a filter or prefilter. The whole blood can mix with prefilter reagents or with filter reagents. A filter can trap the blood cells in the whole blood and let plasma pass through. Plasma can mix with filter reagents. Plasma can flow from the bottom of a filter onto a surface. Plasma can wick or sheet on a surface, across a gap, within a slot. A hydrophilic reagent can promote plasma sheeting or wicking across a gap into a surface capillary. A surface capillary can be formed between the AOW and a surface, i.e. the surface of the PCB, or between the AOW and the IC. Plasma can mix with surface reagent. A surface capillary can connect to a well such that plasma can flow from the surface capillary and into the well. The plasma can flow up the well due to capillary action and can cease to flow once it reaches the top of the well. The plasma can mix with or dissolve surface reagents, hydrophilic reagents, filter reagents, prefilter reagents, well reagents and additional reagents.

The surface reagents, hydrophilic reagents, filter reagents, prefilter reagents, well reagents and additional reagents can be dried reagents that cause a reaction involving endogenous compounds in the plasma. Reactions can change the optical characteristics of the plasma in well. For example, reactions can modify the absorption of the plasma in the well at one or more optical frequencies. A reaction can change the concentration of a reporting reagent. A reporting reagent can absorb light at one or more specific and/or narrowband optical frequencies. A reporting reagent can be included in the surface reagents, hydrophilic reagents, filter reagents, prefilter reagents, well reagents and additional reagents. Different surface reagents, hydrophilic reagents, filter reagents, prefilter reagents, well reagents and additional reagents can be applied or dissolved in different reaction chambers.

Endogenous compounds can be the rate limiting reagents in a reaction. A reaction can be a zero-order, a first order or a higher order chemical reaction. In a rate measurement, the rate of a reporter reagent consumed or produced can be measured. This rate can be proportional to a physiological concentration or one or more endogenous compounds. In an endpoint measurement, the amount of reporter reagent consumed or produced can be measured. This amount can be proportional to a physiological concentration or one or more endogenous compounds.

The device can contain a first LED emitting light with a first optical spectrum and a second LED emitting light with a second optical spectrum, different from the first optical spectrum. The first LED and the second LED can be activated intermittently or concurrently. A reflector can direct the light from the first LED and the second LED into a well. A photodetector, exposed at the bottom of the well, can detect the first optical intensity of the first optical spectrum from the first LED minus the spectral absorbance of the plasma with reagents in the well. A photodetector, exposed at the bottom of a well, can detect the second optical intensity of the second optical spectrum from the second LED minus the spectral absorbance of the plasma and reagents in the well. The first optical intensity measured at different time points can be used to quantify the rate of or the amount of reagent reacted in a reaction. The difference between the first optical intensity and the second optical intensity measured at difference time points can be used to quantify the rate of or the amount of reagents reacted in the reaction.

The first LED can produce a narrowband emission spectrum centered around a first frequency and the second LED can produce a narrowband emission spectrum centered around a second frequency, different from the first frequency. A reaction can alter the absorptivity of plasma at the first frequency. By measuring light emitted from the first LED, and accounting for the time elapsed, a rate or endpoint measurement of a reaction can be calculated. By subtracting the measurements from light emitted from the first LED and second LED, and accounting for the time elapsed, a rate or endpoint measurement of a reaction can be calculated. The first LED and the second LED can illuminate different wells.

The LED can be a surface mounted LED. The LED can be packaged with a lens to direct or concentrate the light towards the first optical element in a reflector. The LED can be packaged using plastic or quartz or be a package-free bare die. The LED can be flipped chip bonded onto a PCB and the illumination can emit from the backside of the LED, opposite the bonding pads. Plastic packages degrade in UV light, but since the device is a single-use disposable, long term degradation of the package is not a concern. The LED can be a laser diode emitting a laser or coherent light. The LED can emit light with narrowband wavelength. The center frequency of emission of the LED can be anywhere in the ultra-violet, visible and infra-red spectrum. The LED can emit light with a spectral line half width of less than 50 nm, 25 nm, 20 nm, 15 nm, 10 nm, 5 nm, 2 nm or 1 nm. The LED can emit with center frequencies at 340 nm, 405 nm, 467 nm, 550 nm, 600 nm, 850 nm or other frequency.

The reflector can be an injection molded from an injection moldable plastic. The Reflector can contain multiple optical elements. A first optical element can reflect the light from an LED to a second optical element. The second optical element can reflect the light from the first optical element into a well. The reflector can direct the light from 1, 2, 3 or 4 different diodes into a well. The reflector can comprise fully or partially reflective surfaces, total internal reflective surfaces or a waveguide. However, for directing shorter wavelength lights like 340 nm and 405 nm light, the material from which the light-pipe or waveguide is manufactured can be transparent or translucent to ultra-violet light, such as cyclic olefin copolymers. The reflector can be incorporated in a housing. The reflector can be composed of multiple optical elements, optical splitters, combiners, mirror surface, lenses, apertures and other features to control or direct light from one or more diodes.

An alternative implementation can be a device in which the filter is mounted on top of the AOW. In this case a filter capillary can traverse the AOW and can deliver plasma from the bottom of the filter into a surface capillary. In this implementation, there is no need for a notch or a gap.

The light from first LED can be redirected into a well by a first optical element and a second optical element. A protrusion in the reflector can channel or direct the light from a second optical element, through a lens and into the plasma in a well. The protrusion can contain a lens that focuses the light from the LEDs onto the bottom of a well. The lens can be flat or concave. The lens can also be convex to avoid bubbles being trapped underneath it when a well fills by capillary action from the bottom up. The reflector can have a third optical element to collect all the light from the LED. The reflector can comprise a waveguide that redirects the light from the LEDs through a protrusion and into a lens.

The protrusion and lens can be mounted above a well. The protrusion and lens can be centered with the well. The protrusion or lens can contact plasma at the top of the well. The protrusion or lens can contact the sidewalls or top of the well. A vent can be formed between the protrusion or lens and the sidewall or top of the well. The vent can allow air inside the well to exhaust out the top of the well to maintain capillary action. The protrusion and lens can be in proximity to the well without contacting the well. The width of the vent can be less than 1 mm, 0.5 mm, 0.25 mm, 0.1 mm, 0.05 mm, 0.025 mm, 0.01 mm, 0.005 mm, or 0.001 mm. The vent can be an annulus around the top rim of the well.

The assay measurement can begin when the plasma contacts the lens or protrusion. The amount of light that reaches the photodetector at the bottom of the well can increase, decrease or change arbitrarily when plasma contacts the lens or protrusion. The change in the amount of light that reaches the photodetector when plasma contacts the lens or the protrusion can be measured and used to begin the assay measurement in the well. The assay measurements in different wells can begin at different times. The change or lack thereof in the amount of light that reaches the photodetector when plasma contacts the lens or the protrusion can be used to indicate under-fill situations where not enough sample was applied to the filter.

The lens or the protrusion can be above the plasma and avoid contacting it. The lens can focus light onto the top of the well. The top aperture of the well can be minimized to reduce the optical influence of the meniscus of the plasma on the illumination of the photodetector. The diameter of the top aperture of the well can be less than 2 mm, 1.5 mm, 1 mm, 0.75 mm, 0.5 mm, 0.4 mm, 0.3 mm, 0.2 mm, or 0.1 mm. The sidewalls of the well can be tapered to improve capillary flow, eliminate light reflecting off the sidewalls and to reduce the diameter of the top aperture of the well. The diameter of the top aperture of the well can be smaller than the diameter of the bottom aperture of the well.

The device can be implemented with only one LED. The reflector can be implemented using total internal reflection and can contain one or more protrusions and lenses. The reflector can direct the light from the LED into multiple wells for analysis.

The device can contain a blank filter which can produce plasma without a reporter reagent. The device can contain a blank well which can accumulate plasma produced by a blank filter, to measure the absorbance of plasma without a reporter reagent, or blank measurement. The blank measurement can be used to determine the concentration of a reporter reagent dissolved in plasma, or the intrinsic absorbance of plasma or both. The blank measurement can be subtracted from the absorbance measurements in other wells. The blank measurement and NADH-blank measurement can be combined to measure endpoint reactions by providing the concentration of the reporter reagent before and after a reaction may occur.

The device can be configured to perform two or more multiplexed chemistry assays with a control. A chemistry test that can have medical relevance is alanine aminotransferase (ALT) and aspartate aminotransferase (AST). The device can be configured so that ALT and AST measurements are performed separately and concurrently in two wells.

A reaction for measuring ALT can comprise 1) ALT in plasma catalyzing the transfer of an amino group from L-alanine to alpha-ketoglutarate to form L-glutamate and pyruvate, and 2) lactate dehydrogenase (LDH) catalyzing the conversion of pyruvate to lactate and the oxidation of Nicotinamide adenine dinucleotide (NADH) to NAD+. A reaction for measuring AST can comprise 1) AST catalyzing the conversion of L-aspartate and alpha-ketoglutarate into oxaloacetate and L-glutamate, and 2) Malate dehydrogenase (MDH) catalyzing the conversion of oxaloacetate into malate and the oxidation of NADH to NAD+. The substrates for measuring AST and ALT can be introduced in abundance so the rate of the reactions can be limited by the rate of endogenous AST and ALT in plasma.

The reporter reagent for both ALT and AST measurements can be NADH. NADH has an absorption peak at 340 nm, so the amount or rate of NADH consumed in the reaction can be measured by illuminating the wells, with light from a first LED with an emission peak at 340 nm. In a rate measurement, the rate of change of the absorbance at 340 nm can be due to the conversion of NADH to NAD+ and can be proportional to the amount of ALT or AST present in the plasma. A photodetector can measure the change in the amount of light transmitted through plasma in the well over time, and can determine from calibration values stored on the IC the corresponding concentration of endogenous ALT. A second LED with an emission peak at 405 nm can be used to provide a constant control illumination intensity.

Filter reagents can comprise dried 1-alanine, NADH, alpha-ketoglutarate, 1-aspartate, MDH, LDH and excipients. The prefilter reagents can comprise dried 1-alanine, 1-aspartate, NADH, alpha-ketoglutarate, MDH, LDH and excipients. The surface reagents can comprise 1-alanine, 1-aspartate, NADH, alpha-ketoglutarate, MDH, LDH and excipients. The well reagents can comprise hydrophilic reagents to maximize the capillary force, 1-alanine, 1-aspartate, NADH, alpha-ketoglutarate, MDH, LDH and excipients. The additional reagents can comprise 1-alanine, 1-aspartate, NADH, alpha-ketoglutarate, MDH, LDH and excipients. To limit the ALT reactions to a well, LDH can be dried exclusively in a slot, or in the well. To limit the ALT reactions to a well, LDH can be exclusively included in the surface reagents, hydrophilic reagents, well reagents or additional reagents. To limit the AST reactions to a well, MDH can be dried exclusively in a slot, or in the well. To limit the AST reactions to a well, MDH can be exclusively included in the surface reagents, hydrophilic reagents, well reagents or additional reagents.

By sharing a filter, the slots can channel plasma into the wells with the same or similar reporter reagent concentration, or NADH concentration.

Each slot can be in contact with a separate filter to decouple the reactions in wells. However, in a decoupled situation, the concentrations of the reporter reagents may vary from well to well.

The dominant source of noise in this assay can be the natural oxidation of NADH into NAD+ by endogenous reactions. The well can be used as a NADH-blank well to measure the natural oxidation of NADH, or NADH-blank measurement. The NADH-blank measurement can be subtracted from the ALT, AST measurements in the wells, respectively, or from other chemistry measurements, to eliminate the contribution of the natural oxidation of NADH or other sources of noise. MDH and LDH can be omitted from the fluid path from the drop of whole blood to the blank well, such that the intended reaction cannot run in the well and only the natural oxidation of NADH is measured in the blank well. The NADH can be included in filter reagents and prefilter reagents wherein the filter and prefilter are shared between the measurement all measurement wells.

The design can be configured to measure the plasma concentrations of albumin, blood urea nitrogen (BUN), calcium, carbon dioxide (bicarbonate), chloride, creatinine, glucose, potassium, sodium, total bilirubin, total protein, alanine, aminotransferase (ALT), alkaline phosphatase (ALP) and aspartate aminotransferase (AST). The center frequency of the narrowband emission of the LEDs can be selected according to the color shift or spectral absorptivity that yields the highest signal to noise ratio.

The device can also include a desiccant, a liquid crystal display (LCD) and one or more batteries to provide power, an IC and an LCD. The device can include a plastic housing to encase the device and all the components. The housing can have branding and test identifiers and a QR code printed or molded on its exterior. The device can have a button or a pull tab to activate. The device can also have a sample capillary that collects whole blood from a finger and wicks it to the filter or prefilter. The device can be configured to accept less than 15 uL of whole blood, or less than 10 uL of whole blood or less than 5 uL of whole blood. The results from the measurement from the device can be displayed on the LCD or wirelessly transmitted to a nearby wireless device. In the cases where the change in amount of the spectral density of the light transmitted through the plasma changes quickly, the device can report results as soon as they are available. Results can be reported in less than 15 minutes, or less than 10 minutes, or less than 5 minutes, or less than 3 minutes, or less than 1 minute.

The filter can be manufactured from polyethersulfone/polyvinylpyrrolidone (PES/PVP) and have graduated porosity. The filter can be coated with glycine to minimize cell leakage and lysis. The area of the filter can be less than 10 $mm^2$ or 30 $mm^2$, or 100 $mm^2$ in order to accept less than 15 uL of whole blood.

The AOW can be machined or injection molded. The AOW can be manufactured from an injection moldable plastic such as Polymethylmethacrylate (PMMA), Acrylonitrile butadiene styrene (ABS) or hydrophilic polymers. The AOW can be transparent, translucid or opaque. The AOW can have mounting points or through holes for a reflector. The PCB can have mounting points or through holes for the AOW and the reflector.

The inner volume of the well can be less than 2 uL, or 1 uL, 0.5 uL, or 0.25 uL, or 0.1 uL of plasma. The diameter of the well can be less than 1 mm, or 0.5 mm, or 0.25 mm. The height of the well can be less than 2 mm, or 1 mm, or 0.5 mm or 0.25 mm. The well can be vertical or positioned at an angle vis-a-vis the surface. The well can have tapered sidewall to promote capillary action.

The angle of the tapered sidewall with respect to a vertical can be more than 1 degree, more than 2 degrees, more than 3 degrees, more than 4 degrees, more than 5 degree, more than 6 degrees, more than 7 degrees, more than 8 degrees, more than 9 degrees, or more than 10 degrees. The angle of the tapered sidewalls of the well can be larger or equal to the highest angle off vertical of the light incident in the well to avoid from reflecting off the sidewalls of the well.

The photodetector can be a Complementary Metal Oxide Semiconductor (CMOS) photodiode. The photodetector can be an active pixel sensor. The photodetector can be connected to a charge integrator such as a capacitor, embedded on the IC. The charge integrator can be connected to an amplifier or a comparator, embedded on the IC. The IC can generate a first reference voltage for the comparator. The IC can drive a reference current through the LED. The IC can discharge the charge integrator or pre-charge the charge integrator to a second reference voltage, drive the reference current through the LED and measure the time until the charge integrator voltage reaches the first reference voltage and triggers the comparator. The charge integrator voltage or the input of the comparator can be chopped to minimize 1/f noise. The time until the charge integrator voltage reaches the first reference voltage and triggers the comparator can correspond to the amount of light incident on the photodetector, and by extension corresponds to the concentration or activity of an endogenous compound being measured. The IC can integrate a microcontroller to control the state of the device, memory to store calibration data and results, a power management unit to drive the LEDs and source power from the battery. The device can have a boost converter to increase the power supply voltage above what the batteries can provide. The IC can integrate a bandgap to generate reference currents and compensate the measurement for temperature differences. The IC can incorporate a heater and a temperature surface temperature sensor to heat the wells to a predetermined temperature during the reaction.

The area of the photodetector can be larger than or equal to the aperture at the bottom of the well. The area of the photodetector can be smaller than the aperture at the bottom of the well to ensure that light incident on the edges of the photodetector does not travel a path length this is difference from the path length traveled by light incidence on the center of the photodetector by more than 20%, 15%, 10%, 5%, 4%, 3%, 2%, 1% or 0.5%. Multiple photodetector can be placed below each well. The photodetectors can be manufactured using different material or have optical filters patterned on them to discriminate different colors of light. The passivation and dielectric layers above the photodetector can be thinned or etched to minimize attenuation of light before reaching the embedded photodetector. The surface of the IC can be coated with an anti-reflective coating (ARC) to minimize the amount of light that reflects off the surface of the IC before reaching the photodetector.

Double-sided tape can be hydrophobic or hydrophilic. The tape can be hydrophobic to avoid delamination after prolonged exposure to plasma. Also, the use of hydrophobic tape can facilitate spotting of different surface reagents spotted in different slots by eliminating unwanted mixing. The tape can be thin to minimize the dead volume of plasma and therefore to reduce the amount of whole blood needed to run the device. The thickness of the tape can be less than 1 mm, 0.1 mm, 0.05 mm, 0.025 mm or 0.01 mm. Multiple slots can connect to multiple fluidically isolated filters but channel multiple plasmas to the same AOW or to same well in AOW. Multiple slots can connect to a single filter.

A gap between AOW and the filter can eliminate red blood cells from wicking into plasma via the capillary effects at the interface between the filter and the AOW. The length of the gap can be less than 5 mm, 2 mm, 1 mm, 0.5 mm, 0.2 mm, 0.1 mm, 0.05 mm, or 0.025 mm. The gap can be eliminated provided there is a notch or barrier for whole blood cells on the edge of the filter.

A notch can reduce or eliminate the flow of whole blood cells from the top of the filter into plasma in the gap via the edge of the filter. The presence of red blood cells in the well can interfere with the chemistry measurements. The notch can be a depression, an indent, or any feature in the filter that reduces or eliminate the lateral flow of red blood cells through the edge of the filter or over the top of the filter. The notch can be manufactured by crushing the filter wherein blood cells are blocked from traveling laterally through the crush region. The crush region can be less than 5 mm, 2 mm, 1 mm, or 0.5 mm or 0.25 mm from the edge of the filter. The notch can be substituted by a hydrophobic dam or barrier on the edge of the filter or a physical dam or barrier on the edge of the filter that prevents red blood cells from reaching plasma in the gap via the edge of the filter.

The output power of the LED can vary according to lot number and other factors. Small tolerance changes in the position of the reflector can affect the amount of light it directs into the wells. The sensitivity of the photodetector can vary according to a variety of factors. For endpoint measurements, it can be necessary to calibrate the optical system, or to calibrate the amount of light incident on the photodetector and the signal that it corresponds. The system can be calibrated in air, where the wells are filled with air. In this case, the optical power transmitted out of the LED, through the reflector and into the photodetector with air in the well can be the same as the optical power transmitted out of the LED, through the reflector and into the photodetector with fluid in the well. Due to changes in refractive indices, the optical power transmitted out of the LED, through the reflector and into the photodetector with air in the well can be a deterministic function of the optical power transmitted out of the LED, through the reflector and into the photodetector with fluid in the well. Alternatively, the optical power transmitted out of the LED, through the reflector and into the photodetector can be measured using a calibration fluid in the well, such as a coating reagent. Alternatively, the sensitivity of the photodetector can be calibrated, and the optical power transmitted out of the LED, through the reflector and into the photodetector can be measured during the assay.

Temperature is an important factor that can alter the optical power emitted by the LED or the sensitivity of the photodetector or the activity of enzymes. The current through the LED can be temperature compensated so the output power of the LED is constant or nearly constant with respect to temperature. The reference voltage for the comparator can be compensated so the integration time of the photocurrent is constant or nearly constant with respect to temperature. The IC can have a memory block that stores temperature calibration data to calibrate the assay measurements for changes in temperature. A heater integrated in the IC or on the PCB to maintain the well at a constant and predictable temperature.

The LED can be flip chip bonded onto the PCB. PCB feature registration and the flip-chip bonding process can result in LED positional errors. To overcome these errors, the LED can be placed on the PCB first and the IC, AOW and reflector can be placed on PCB subsequently to the LED and registered to the LED. In some cases, components will be mounted on the other side of the PCB. The LED can be registered to a through-feature like one or more vias or one or more edges of the PCB, and IC, AOW and reflector can be registered to the same through-features.

The device can contain electrochemical sensors that function either in plasma or whole blood. Platinum electrodes and permselective films can be patterned on separate electrochemical IC to enable electrochemical sensing on the device. Ion selective electrodes can be integrated in the electrochemical IC. The device can contain a magnetic sensing IC that performs magnetic particle labeled immuno-assays, wherein magnetic particles conjugated to antibodies can capture soluble target proteins in plasma. The magnetic particles can sediment via gravity to the antibody coated surface of the magnetic sensing IC to which they can bind strongly in the presence of the target proteins. Magnetic sensing IC can integrate current carrying conductors adjacent to magnetic particle sensors. The current carrying conductors can remove magnetic particles weakly bound to the surface of the magnetic sensing IC from atop the magnetic particle sensors, while the magnetic particles sensors can detect magnetic particles that remain strongly bound to surface of the magnetic sensing IC above magnetic particle sensors. Magnetic particles can be loaded and stored in a dry state in a well. Plasma can rehydrate and release the dried magnetic particles which incubate with plasma, capture the target proteins and sediment to the surface of the magnetic sensing IC. The magnetic particle sensors can be implemented as photodetectors embedded in the magnetic sensing IC. The device can contain one IC to perform chemistry tests and another IC to perform immuno-assays. The device can contain one or more ICs, one or more electrochemical ICs and one or more magnetic sensing ICs. Electrochemical IC and magnetic sensing IC can be integrated on or parallel or flush with the PCB. The IC, electrochemical IC and magnetic sensing IC can have digital interfaces for communication like I²C or SPI.

The device can be integrated into a blood collection system that is fitted onto a patient and take whole blood from the patient. The device can be integrated into the blood collection system and can take whole blood from the blood collections system for analysis. The blood collection may or may not have an LCD to display the assay results. The assay results can be transmitted wirelessly to a nearby mobile device.

Figure 7:
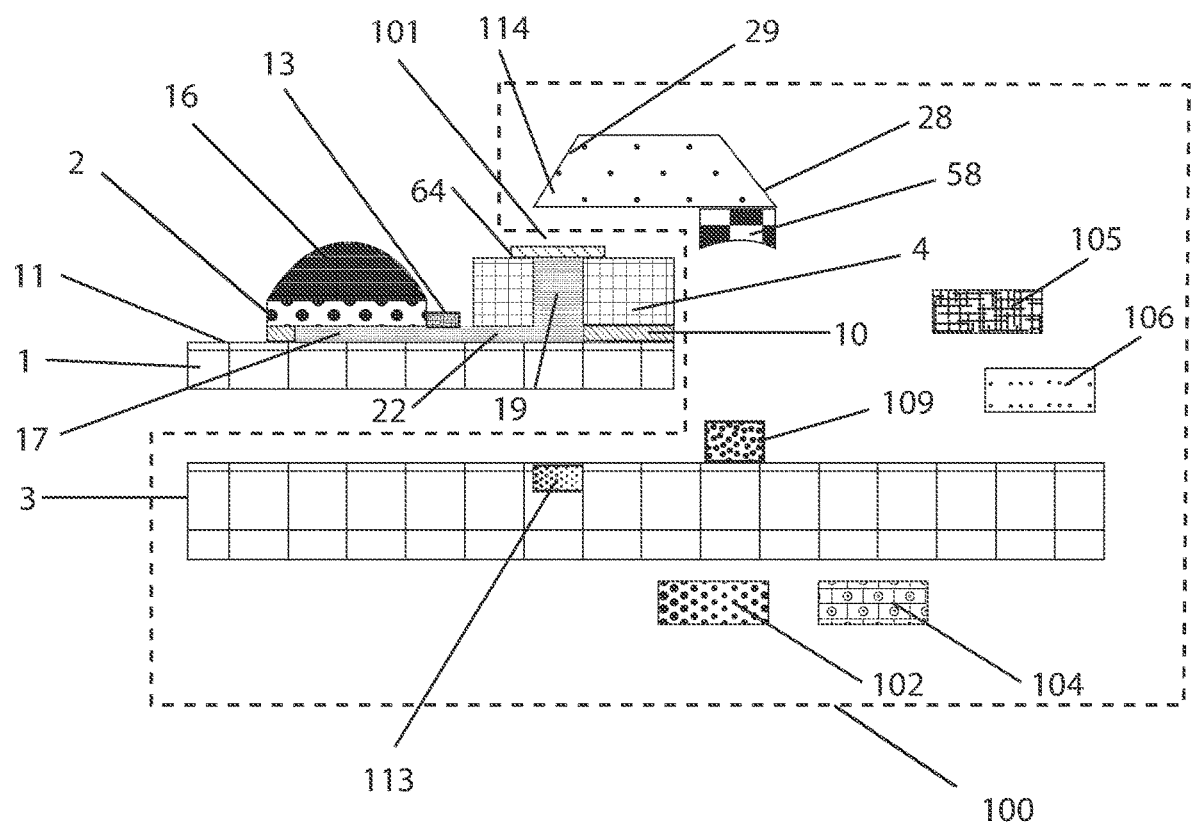
FIG. 7 presents the cross-sectional side view of device inserted into port of reader.

FIG. 7 presents a cross-sectional view of device 1 inserted into port 101 of reader 100. The reader 100 can contain one or a plurality of LEDs 109. The reader 100 can contain one or a plurality of reflectors 114 for redirecting the light 21 through one or a plurality of wells 19 in AOW 4 in device 1. The reader 100 can contain one or a plurality of photodetectors 113 to detect light 21. Reader 100 can contain heater 102, a digital display 105, and battery 104. Device 1 can be inserted into port 101. Reader 1 can contain one or a plurality of optical apertures 116 and blinds 121 to avoid cross illumination between wells. Cover 64 can be used to avoid evaporation from well 19. Reflector 114 can redirect light 21 from LED 109 and through cover 64. LED 109 can have all the characteristics of LED 5. Photodetector 113 can have all the characteristics of photodetector 8. Reflector 114 can have all the characteristics of reflector 6.

Figure 8:
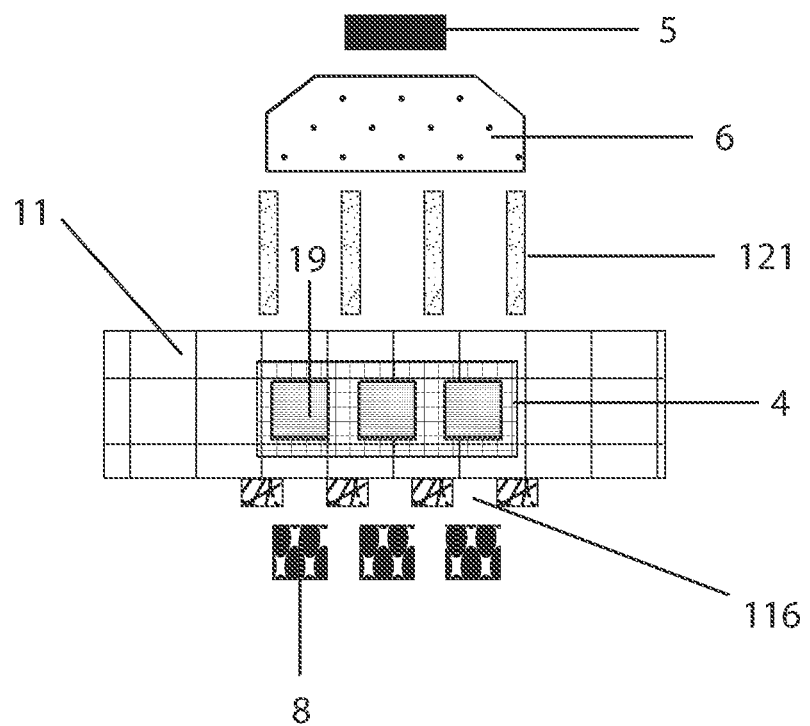
FIG. 8 presents the top view of the device wherein light traverses the well laterally or a horizontally through well.

FIG. 8. presents the top view of device 1 wherein the cross section of the well 19 in the AOW 4 are square, rectangular, trapezoidal or a parallelogram. AOW 4 can be transparent. Light 21 can pass through AOW 4 laterally, or parallel to surface 11. Blinds 121 on either side of AOW 4 can reduce or eliminate illumination cross talk. Apertures 116 on either side of AOW 4 can reduce or eliminate illumination cross talk. Light 21 can be detected by photodetector 8 or photodetector 113. Well 19 can have two inner parallel inner surfaces to define and control path length 39. Photodetector 8 can be mounted above surface 11 to receive light 21 directly. Photodetector 8 can be mounted parallel with surface 11 and an additional reflector can redirect light 21 from AOW 4 to photodetector 8. Reflector 114 and photodetector 113 can be on opposite sides of well 19. LED 109 and photodetector 113 can be on opposite sides of well 19. Blind 121, aperture 116 and diffuser 115 can be mounted in reader 100 or device 1. AOW 4 can comprise a reflector to guide light 21 onto photodetector 8 or photodetector 113.

Figure 9:
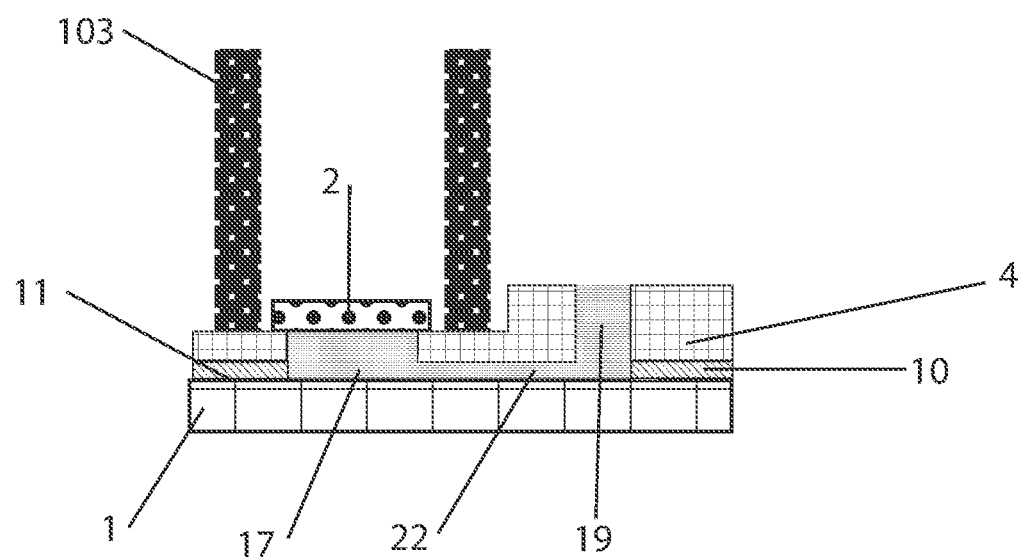
FIG. 9 shows the cross-sectional side view of device fitted with a vial.

FIG. 9. shows the a cross-sectional side view of vial 103 mounted on device 1. Filter 2 can be any porous material for releasing dissolved reagents into filtrate 24. Vial 103 can contain vial reagents in wet or dry state. Vial 103 can have a cap or opening to insert sample 16. Sample 16 can mix with vial reagents in vial 103. Vial 103 can have a mechanism to push or pop wherein sample 16 can incubate with vial reagents before the push or pop action releases the mixture through filter 2.

Figure 10:
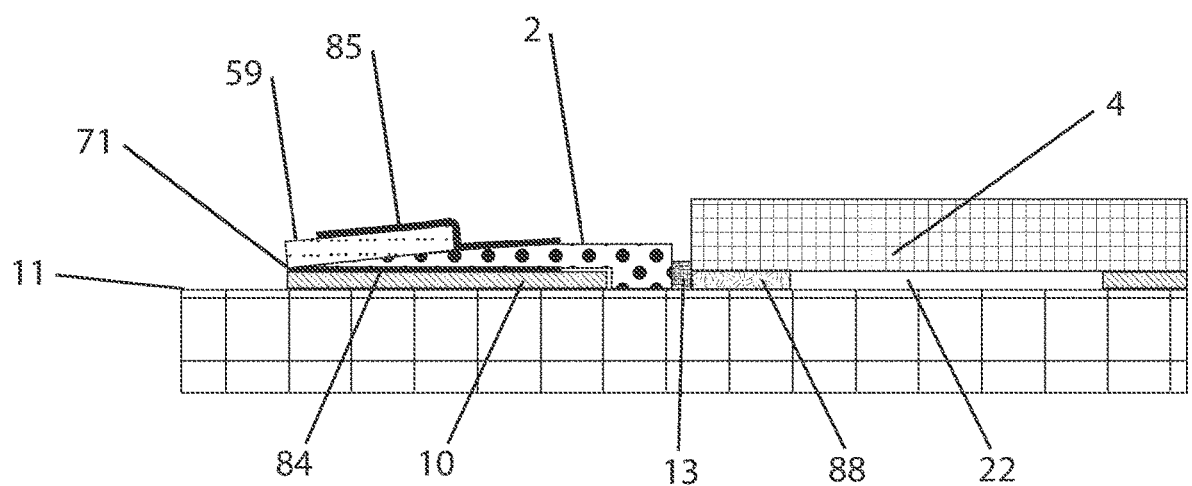
FIG. 10 presents a cross-sectional side view of a filter module mounted on surface.

FIG. 10 presents a cross-sectional side view of device 1. A filter module 71 can contain prefilter 59 and filter 2 along with two lamination surfaces, namely lamination surface 84 and lamination surface 85. For an ALT reaction, prefilter 59 can contain NADH, alpha-ketoglutarate and excipients in a dry form. Filter 2 can contain 1-alanine, LDH and excipients in a dry form. For an AST reaction, prefilter 89 can contain NADH, alpha-ketoglutarate and excipients in a dry form. Filter 55 can contain aspartate or similar molecule, LDH, MDH and excipients in a dry form. Pyridoxal phosphate can be added in either prefilter or filter.

Figure 11:
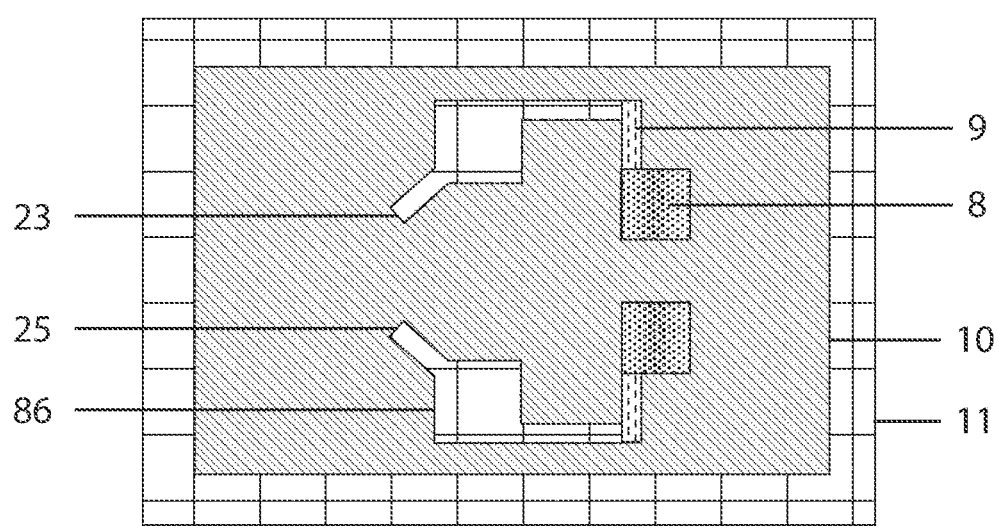
FIG. 11 presents the cross-sectional top view of tape with channel and enlargement on surface.

FIG. 11 presents the cross-sectional top view of tape 10 with channel 25 and enlargement 86 on surface 11. The enlargement can be wider than channel 25 and can allow the plasma 17 or filtrate 24 to circumvent the crush region 88 and enter surface capillary 22. The crush region 88 can be restrictive to the flow of plasma 17 or filtrate 24.

Figure 12:
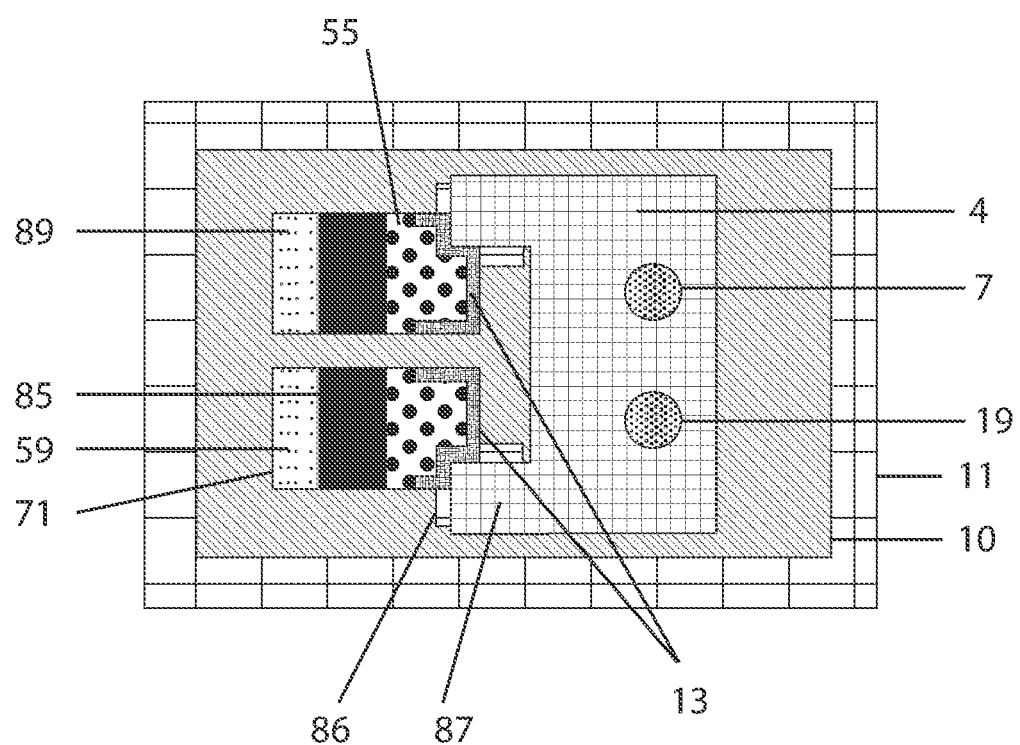
FIG. 12 presents the cross-sectional top view of filter module integrated with AOW.

FIG. 12 presents the cross-sectional top view of filter module 71 integrated with AOW 4. Device 1 can contain one or a plurality of filter modules. The space between filter modules can be less than 5 mm, 4 mm, 3 mm, 2 mm, 1 mm, 0.5 mm. A space between filter modules can reduce or eliminate fluidic cross talk. Two or more filter modules can share a prefilter to facilitate flow from inlet 66 to the two or more filter modules.

Figure 13:
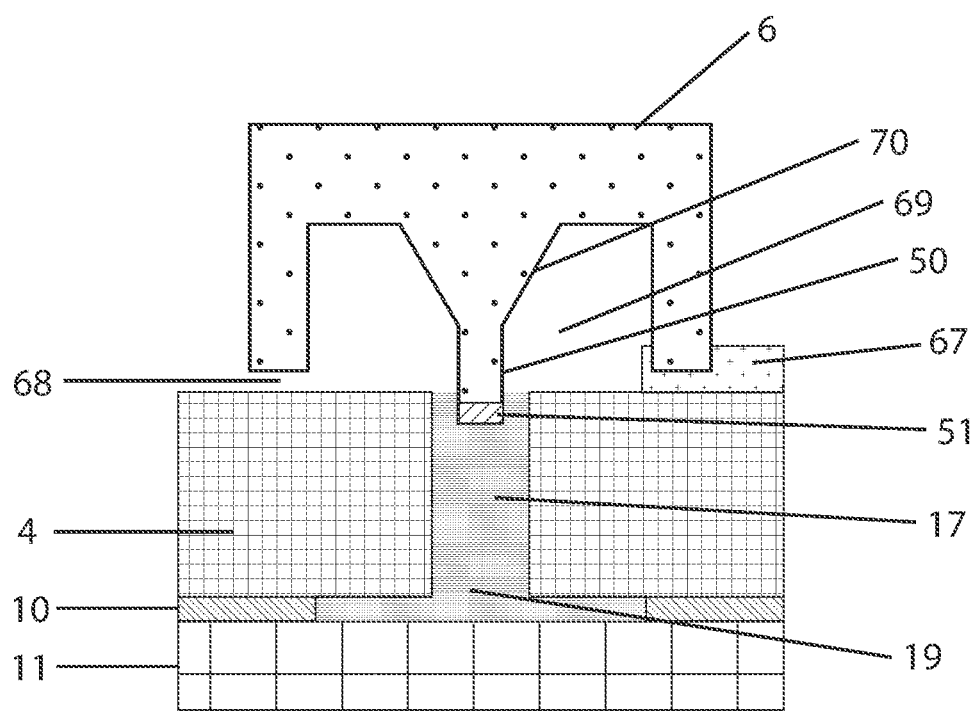
FIG. 13 shows the cross-sectional side view of reflector with cavity mounted on AOW with optic tape.

FIG. 13 shows the cross-sectional side view of reflector 6 with cavity 69 mounted on AOW 4 with optic tape 67. Optic tape 67 can be thin to ensure good registration of lens 51 with surface 11. The path length 39 can be defined by the distance from lens 51 to surface 11. The thickness of optic tape 67 can be less than 100 µm, 50 µm, 30 µm, 20 µm or 10 µm.

Figure 14:
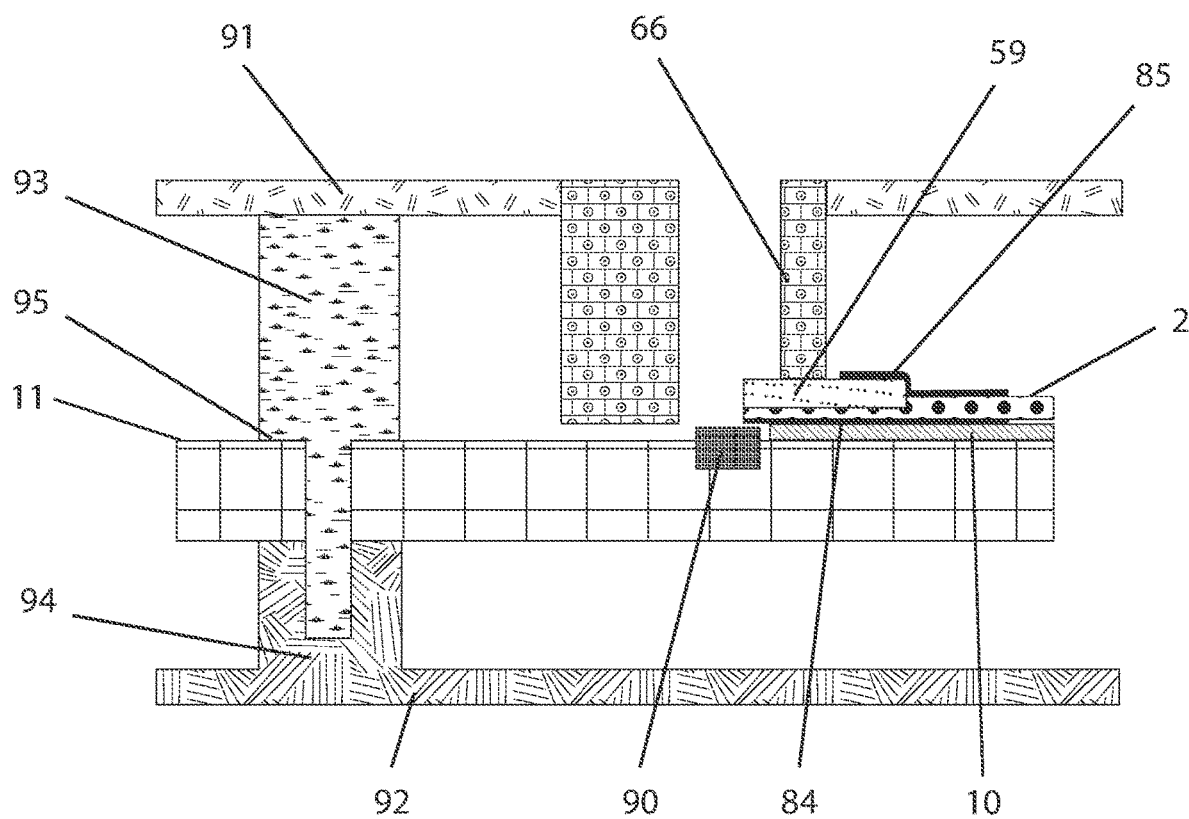
FIG. 14 presents the cross-sectional side view of top housing fitted into bottom housing 92 and applying pressure to crush filter module.

FIG. 14 presents the cross-sectional side view of top housing 91 which can be fitted into bottom housing 92 and can apply pressure and crush filter module 71. Inlet 66 can be a capillary. The bottom of inlet 66 can contact or crush filter module 71 or filter 2. The bottom of inlet 66 can contact surface 11, PCB 3 or tape 10. Sample electrode 90 can be exposed and in contact with the sample 18 or whole blood 16 in inlet 66. Sample 18 or whole blood 16 can flow from inlet 66 into prefilter 59 of filter module 71. Prefilter reagents in prefilter 59 can dissolve into sample 18 or whole blood 16. Prefilter reagents and sample 18 can flow into or onto filter 2. Lamination surfaces 85 and 84 can prevent sample 18 from bypassing prefilter 59 or filter 2.

I claim:

1. A spectrophotometer device for measuring the concentration or activity of one or more analytes in a plasma comprising:
a light emitting diode (LED) configured to emit a light with a narrow band optical spectrum;
a photodetector configured to be sensitive to the light;
an array of wells (AOW) comprising a first well;
a reflector with an output lens configured to redirect the light through the plasma in the first well and onto the photodetector; and
a reporter molecule in the first well, wherein the reporter molecule is configured to absorb part or all of the light;
wherein the reflector is mountable on the array of wells (AOW) using an optic tape, wherein there is a vent between the reflector and the array of wells (AOW), wherein the vent has a vent length, and wherein the vent is configured to eliminate or reduce mass transport of air and/or water and/or the reporter molecule.

2. The device of claim 1, wherein the spectrophotometer has an optical cavity, wherein the optical cavity has a fluid stop gap by permitting output lens to contact the plasma in the first well and preventing the plasma in the first well from flowing into the optical cavity or into the vent.

3. The device of claim 2, wherein the optical cavity has a pocket of air between the reflector and the array of wells (AOW).

4. The device of claim 3, wherein the optical cavity comprises a light guide configured to guide and/or concentrate the light from an optical element in the reflector to the output lens.

5. The device of claim 4, wherein the optical cavity has a conical shaped element and wherein the device is configured so the light passes through the conical shaped element before the lens and wherein the conical shaped element is configured to concentrate the light onto the output lens.

6. The device of claim 4, wherein a conical shaped element is configured to direct the light that is not incident on the output lens away from an aperture at the top of the first well, wherein the conical shaped element is configured to reduce and/or eliminate the amount of light entering the first well that is not incident on the output lens.

7. The device of claim 3, wherein an inner surface of the optical cavity is hydrophobic and coated with a hydrophobic coating to avoid condensation from the plasma or a filtrate in the first well.

8. The device of claim 3, wherein the inner surface of the optical cavity is polished so as to reduce and/or avoid condensation from the plasma or a filtrate in the first well.

9. The device of claim 3, wherein an inner surface area of the optical cavity is configured to be minimized to reduce or avoid condensation from the plasma or a filtrate in the first well, and wherein the reflector comprises a hydrophobic material.

10. The device of claim 2, wherein the reflector comprises a hydrophobic material.

11. The device of claim 1, wherein the vent length is longer than 3 mm.

12. The device of claim 1, wherein the vent has a vent cross-sectional area, and wherein the vent length divided by the vent cross-sectional area is greater than $100*m^{-1}$.

* * * * *